(12) United States Patent
Page et al.

(10) Patent No.: US 12,456,219 B1
(45) Date of Patent: Oct. 28, 2025

(54) OPTICAL WEIGHT ESTIMATION SYSTEM

(71) Applicant: The RealReal, Inc., San Francisco, CA (US)

(72) Inventors: Christian David Page, Durham, NC (US); Boris Michael Spokoyny, Cambridge, MA (US); Xu Han, Dalian (CN); Gabriel Seth Ganot, San Francisco, CA (US); Chongyue Yi, Portland, OR (US); John Paul Dombrowski, Campbell, CA (US)

(73) Assignee: The RealReal, Inc., San Francisco, CA (US)

( * ) Notice: Subject to any disclaimer, the term of this patent is extended or adjusted under 35 U.S.C. 154(b) by 474 days.

(21) Appl. No.: 17/888,452

(22) Filed: Aug. 15, 2022

Related U.S. Application Data

(60) Provisional application No. 63/322,215, filed on Mar. 21, 2022, provisional application No. 63/260,278, filed on Aug. 15, 2021.

(51) Int. Cl.
*G06T 7/62* (2017.01)
*G06T 7/11* (2017.01)
(Continued)

(52) U.S. Cl.
CPC .............. *G06T 7/62* (2017.01); *G06T 7/11* (2017.01); *G06T 7/13* (2017.01); *G06T 7/50* (2017.01);
(Continued)

(58) Field of Classification Search
CPC ..... G06T 7/62; G06T 7/11; G06T 7/13; G06T 7/50; G06T 2207/20081; G06T 2207/20152
(Continued)

(56) References Cited

U.S. PATENT DOCUMENTS 11,532,149 B1* 12/2022 Floerkemeier ....... G06V 30/186
2009/0245623 A1* 10/2009 Nasser ................... G06T 7/543
382/199

(Continued)

OTHER PUBLICATIONS

"Co-Axial Dome Light (CODL) https://www.metaphase-tech.com/diffused-dome-tube-lights/co-axial-dome-light-codl" (Year: 2019).*

*Primary Examiner* — Chineyere Wills-Burns
*Assistant Examiner* — Emmanuel Silva-Avina
(74) *Attorney, Agent, or Firm* — Adibi IP Group, PC; Amir V. Adibi; Andrew C. Palmer

(57) ABSTRACT

An optical weight estimation system comprises a controller, a display panel, a control panel, an imaging assembly, and user input interface. The system provides for rapid analysis of mounted structures that cannot be readily unmounted and weighed using a traditional scale. The system estimates weight of a structure from structure characteristic information supplied via user input and from an image of a surface of the structure obtained via the imaging assembly. The image is used to determine at least one dimension of the structure. The controller uses the one or more dimensions obtained from the image of the structure and the user supplied structure characteristic information to generate a weight estimate of the structure. The system allows a manual operator to rapidly analyze one or more mounted structures without having to unmount the structure from the setting and yields significant time savings as compared to known weight estimation techniques.

19 Claims, 28 Drawing Sheets

ESTIMATING WEIGHT USING OPTICAL WEIGHT ESTIMATION SYSTEM

(51) Int. Cl.
 *G06T 7/13* (2017.01)
 *G06T 7/50* (2017.01)
(52) U.S. Cl.
 CPC ............... *G06T 2207/20081* (2013.01); *G06T 2207/20152* (2013.01)
(58) Field of Classification Search
 USPC ........................................................ 382/109
 See application file for complete search history.

(56) References Cited

U.S. PATENT DOCUMENTS

| | | | | |
|---|---|---|---|---|
| 2019/0147372 A1* | 5/2019 | Luo | ....................... | G06N 20/00 706/20 |
| 2021/0027447 A1* | 1/2021 | Parikh | ..................... | G06F 18/22 |
| 2021/0065395 A1* | 3/2021 | Wiley | .............. | G06K 19/06037 |
| 2021/0201461 A1* | 7/2021 | Parikh | .................. | G06T 7/0002 |

* cited by examiner

STRUCTURE IN A MOUNTED SETTING

EXPANDED VIEW OF STANDARD ROUND BRILLIANT GEMSTONE

STANDARD ROUND BRILLIANT GEMSTONE GEOMETRY

WEIGHT OF FACETED STRUCTURE = LENGTH × WIDTH × [$L_{PAV}$ + $L_{CWN}$] × DENSITY × CORRECTION FACTOR $L_{PAV}$ = TAN($A_{PAV}$) × D/2

$L_{CWN}$ = TAN($A_{CWN}$) × D−T/2

WEIGHT ESTIMATION EQUATION

OPTICAL WEIGHT ESTIMATION SYSTEM

WEIGHT ESTIMATION CONTROLLER

IMAGE ANALYZER

CONVOLUTIONAL NEURAL NETWORK

IMAGING ASSEMBLY

CONTROL PANEL

IMAGING ASSEMBLY WITH MOTORIZED ZOOM LEVELS
(ANOTHER EMBODIMENT)

MANUAL DIMENSION ENTRY USER INTERFACE

MANUAL POINT SELECTION USER INTERFACE
(USER SELECTS FIRST POINT OF CONTOUR)

MANUAL POINT SELECTION USER INTERFACE
(USER SELECTS SECOND POINT OF CONTOUR)

MANUAL POINT SELECTION USER INTERFACE
(USER SELECTS THIRD POINT OF CONTOUR)

CONTOUR DETECTED AND WEIGHT ESTIMATED
FROM SELECTED POINTS

PERFORM ESTIMATION USING PREDICTED CONTOUR
FROM IMAGE WITH WATERSHED SEGMENTATION

APPLY IMAGE SEGMENTATION MODEL TO OBTAIN
BINARY IMAGE
(STEP 503 IN FIG. 20)

TRAINING SEGMENTATION MODEL

DETERMINING WATERSHED SUCCESSFUL
(STEP 505 IN FIG. 20)

DETECT CONTOUR ON TARGET
(STEPS 506/507 IN FIG. 20)

USE RANDOM SAMPLE CONSENSUS TO DETECT CONTOUR
(STEPS 1002 IN FIG. 25)

EXAMPLE OF RANSAC FOR CIRCLE DETECTION
(SEE FIG. 26)

PERFORM ESTIMATION USING PREDICTED CONTOUR FROM IMAGE WITHOUT WATERSHED SEGMENTATION

OPTICAL CHARACTERISTIC ESTIMATION SYSTEM

FEATURE DETECTION AS A SERVICE SYSTEM

OPTICAL WEIGHT ESTIMATION SYSTEM

CROSS REFERENCE TO RELATED APPLICATIONS

This application claims the benefit under 35 U.S.C. § 119 from U.S. Provisional Patent Application Ser. No. 63/322,215, entitled "Optical Weight Estimation System," filed on Mar. 21, 2022, the subject matter of which is incorporated herein by reference. This application also claims the benefit under 35 U.S.C. § 119 from U.S. Provisional Patent Application Ser. No. 63/260,278, entitled "Optical Weight Estimation System," filed on Aug. 15, 2021, the subject matter of which is incorporated herein by reference.

TECHNICAL FIELD

The present invention relates generally to metrology systems, and more specifically, to weight estimation instruments.

BACKGROUND INFORMATION

Quality of diamond gemstones is typically assessed by carat weight, color grade, clarity grade, and cut grade. Carat weight has units of metric carats. One carat is equal to 0.2 grams. In an unmounted setting, the weight of a diamond gemstone is determined by weighing the gemstone. When the diamond gemstone is mounted in a setting, not all dimensions of the gemstone are readily available for measurement. Highly skilled gemologists are able to estimate the volume using calipers despite the gemstone being mounted in the setting. However, repeatability and reproducibility is an issue. For example, one gemologist might have different estimates of volume than another gemologist. While variation in volume might appear slight, any variation in volume might have significant cost implications due to the extraordinary value of some diamonds.

SUMMARY

An optical weight estimation system comprises a weight estimation controller, a display panel, a control panel, an imaging assembly, and user input interface. The optical weight estimation system provides for rapid analysis of mounted structures that cannot be readily unmounted and weighed using a traditional scale. The optical weight estimation system estimates weight of a structure from structure characteristic information supplied via user input and from an image of a surface of the structure obtained via the imaging assembly. The weight estimation controller uses the image to determine at least one dimension of the structure. Once the one or more dimensions are determined, the weight estimation controller uses the one or more dimensions and the user-supplied structure characteristic information to generate a weight estimate of the structure. The optical weight estimation system allows a manual operator to rapidly analyze one or more mounted structures without having to unmount the structure from the setting. The optical weight estimation system yields significant time savings as compared to known weight estimation techniques, which consume a significant amount of time and present challenges depending on how visible the gemstone is in the setting.

In operation, an operator holds a structure to be analyzed beneath the imaging assembly. The display panel presents imaging output by the imaging assembly. Once the image is centered, the operator supplies input via the user input interface. In one example, the user input interface is a foot pedal. The image is captured and presented on the display panel along with feedback indicating features identified by the weight estimation controller and the weight estimation. If the feedback presented on the display panel indicates that the weight estimation controller adequately identified features of the structure, then the operator stores the weight estimation. Otherwise, the operator repeats the image capture process to obtain a new image of the structure.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
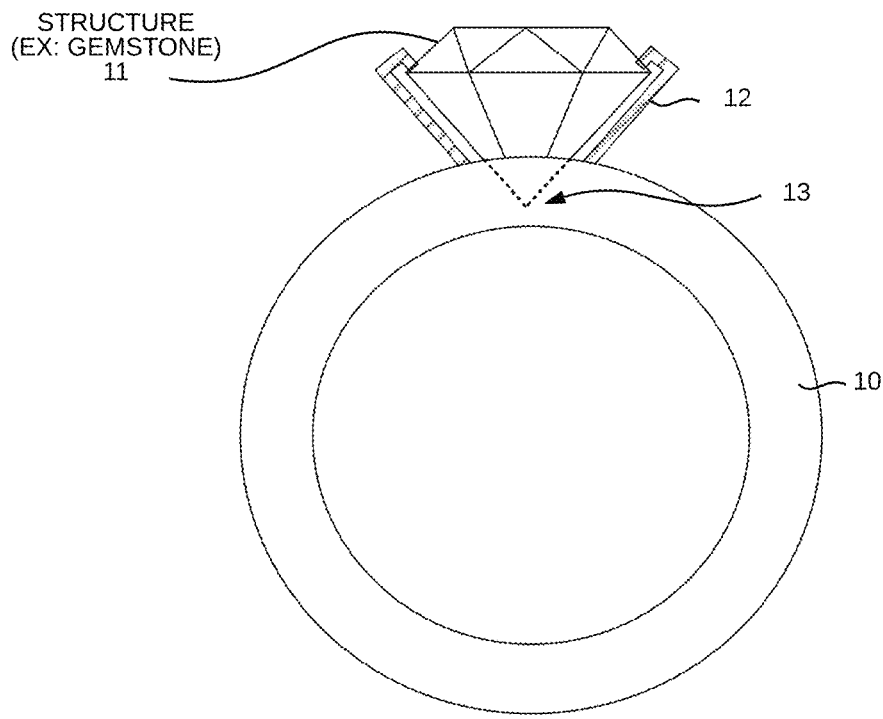
FIG. 1 is a diagram showing a cross-sectional view of a jewelry item 10 with a mounted structure 11.

FIG. 1 is a diagram showing a cross-sectional view of an item 10 with a mounted structure 11. The structure 11 is a clear gemstone, a colored gemstone, a mineral crystal, a faceted cut material, a faceted amorphous structure, or any structure with desirable weight information. In the example of FIG. 1, the item 10 is a ring and the structure 11 is a standard round brilliant diamond. The diamond 11 is attached to the ring 10 via prongs 12. The diamond 11 has desirable illumination characteristics that provide visual appeal to the ring 10. The bottom portion of the diamond 11 is referred to as a culet 13. To estimate the mass of diamond 11, various dimensions of diamond 11 are needed. Dimensions partially obstructed from view present challenges in performing weight estimation. For example, when the diamond 11 is mounted or set in the ring 10 via prongs 13, the culet 13 may not be visible, as indicated by the dashed lines.

Figure 2:
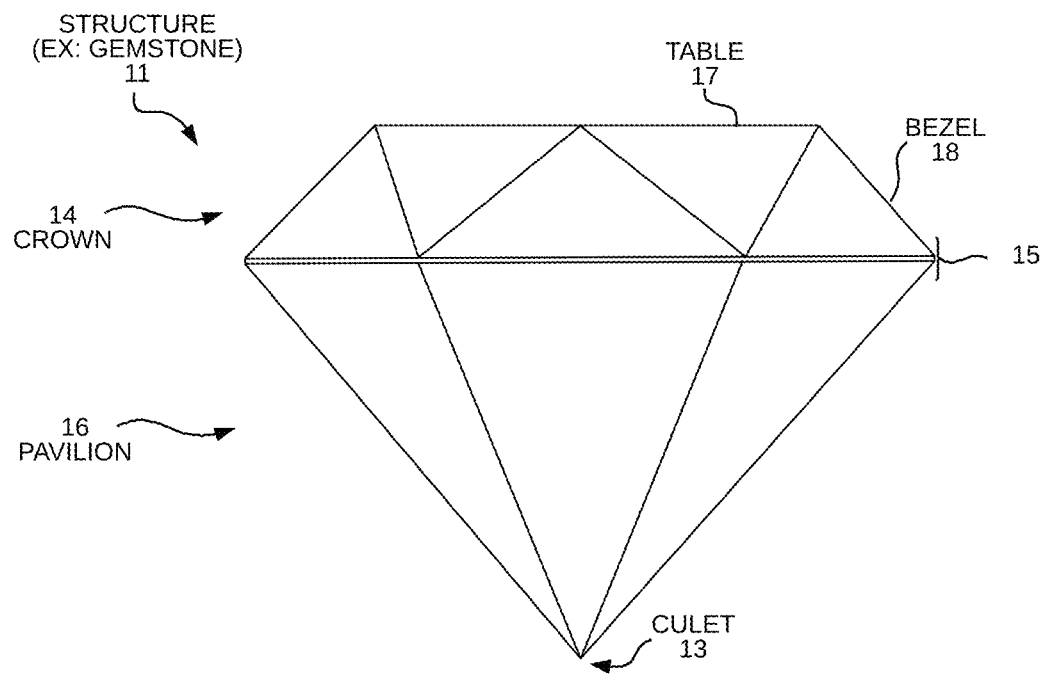
FIG. 2 is a diagram showing an enlarged cross-sectional view of the diamond 11 along with key structural parts.

FIG. 2 is a diagram showing an enlarged cross-sectional view of the diamond 11 along with key structural parts. The diamond 11 has a crown 14, a girdle 15, and a pavilion 16. Table 17 forms a top surface of the diamond 11. A bezel 18 is a slanted surface that extends from the table 17 to the girdle 15. The culet 13 is disposed at a bottom of the diamond 11. When the diamond 11 is in the setting of ring 10, as in FIG. 1, the culet 13 is not visible or accessible.

Figures 3, 4:
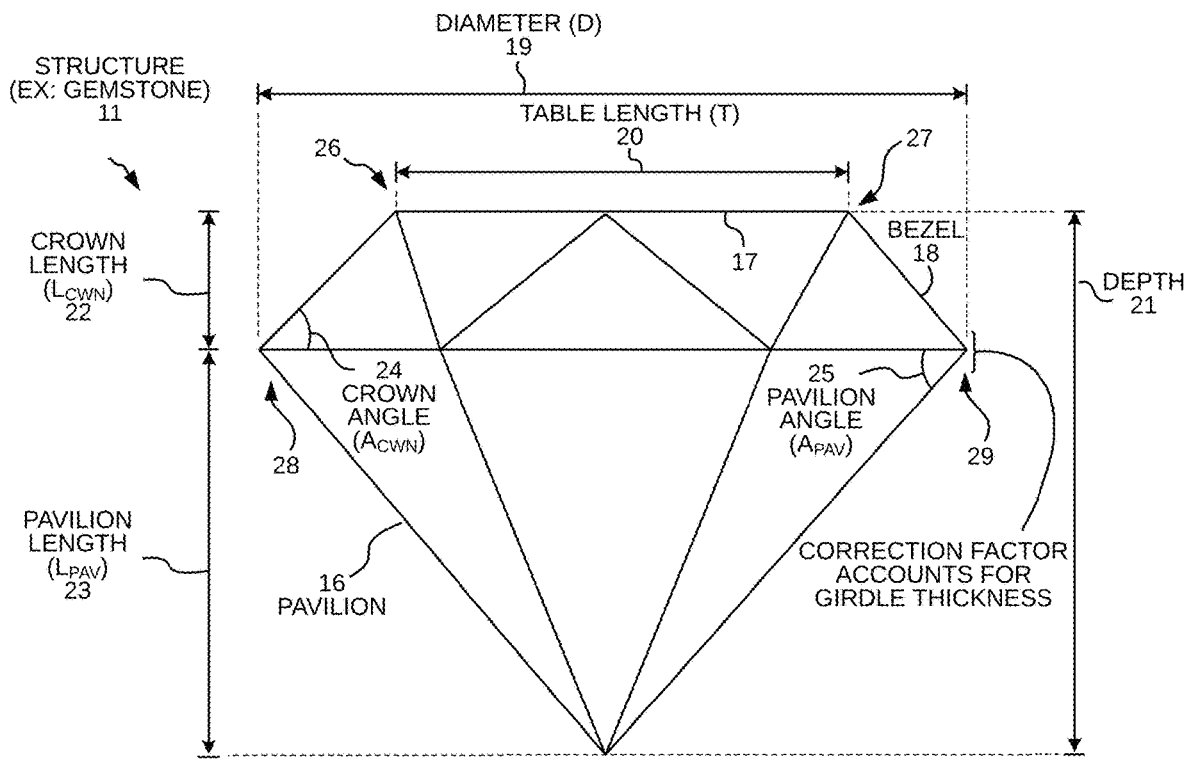
FIG. 3 is a diagram showing an enlarged cross-sectional view of the diamond 11 along with various geometrical dimensions.
FIG. 4 is an equation 30 for estimating weight of the diamond 11.

FIG. 3 is a diagram showing an enlarged cross-sectional view of the diamond 11 along with various geometrical dimensions. The dimensions identified in FIG. 3 are used in determining a volume of the diamond 11. The volume of the diamond 11 is in turn used to determine the weight of the diamond 11. The weight is also referred to in the gemology arts as the carat weight. The dimensions of the diamond 11 include a diameter (D) 19, a table length (T) 20, a depth 21, a crown length ($L_{CWN}$) 22, a pavilion length ($L_{PAV}$) 23, a crown angle ($A_{CWN}$) 24, and a pavilion angle ($A_{PAV}$) 25. The table length 20 extends from one end 26 to an opposite end 27. The diameter 19 extends from one end 28 of the girdle 15 to another opposite end 29. The crown length 22 extends from the table 17 to the girdle 15. The pavilion length 23 extends from the girdle 15 to the culet 13. The crown angle 24 is the angle between the bezel 18 and the girdle 15. The pavilion angle 25 is the angle between the girdle 15 and a surface of the pavilion 16. In the example of FIG. 3, the girdle is not shown. In estimating weight, the girdle thickness is accounted for using a correction factor.

FIG. 4 is an equation 30 for estimating weight of the diamond 11. The weight of the diamond 11 is equal to the volume multiplied by density 31 of diamond 11. The volume is equal to a length times the width times the depth. In the case of the diamond 11, the length times the width is equal to the diameter 19 squared. The depth 21 is equal to the crown length 22 plus the pavilion length 23 as shown in FIG. 3. Density 31 is dependent upon the type of material of the structure being analyzed. The correction factor 32 corrects for the cut of the diamond 11 as well as the girdle thickness. In accordance with various embodiments, image analysis is performed to estimate the diameter 19 and the table length 20. Structure characteristic information, including the depth 21, the density 31, and the correction factor 32, is supplied via user input.

Alternatively, depth 21 is calculated using the estimated diameter 19 and table length 20, without requiring user input. Additionally, density values can be generated based on a corresponding stone species selected by the user. As for the correction factor explained below, default corrections are generated and are adjustable by the user. In other embodiments where an optical estimation system is utilized to determine a different characteristic, a corresponding equation would be used to generate the desired characteristic.

Figure 5:
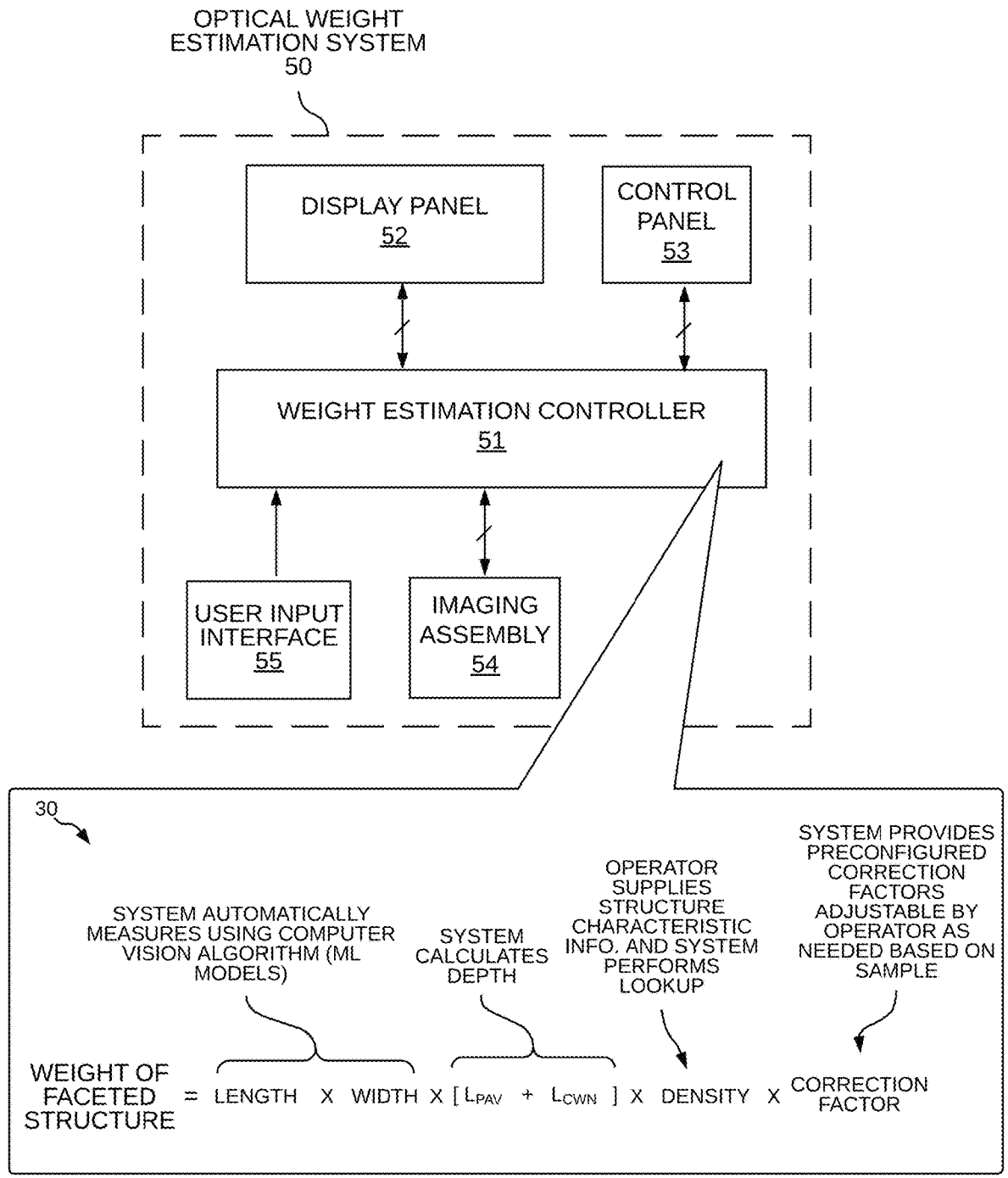
FIG. 5 is a diagram of an optical weight estimation system 50.

FIG. 5 is a diagram of an optical weight estimation system 50. The optical weight estimation system 50 comprises a weight estimation controller 51, a display panel 52, a control panel 53, an imaging assembly 54, and user input interface 55. The optical weight estimation system 50 provides rapid analysis of mounted structures that cannot be readily unmounted and weighed using a traditional scale. The optical weight estimation system 50 estimates weight of a structure from structure characteristic information and from an image of the structure. The structure characteristic information is supplied by a user operator via the control panel 53, is received from an external source, or is determined via other mechanisms not involving user input. The image is obtained via the imaging assembly 54. The imaging assembly 54 comprises any suitable hardware for obtaining images of sufficient quality and resolution of the structure required to perform the estimation. The weight estimation controller 51 uses the image to determine at least one dimension of the structure.

The display panel 52 and the control panel 53 include any suitable input and output interface hardware. In one embodiment, the display panel 52 and the control panel 53 are presented on a single interface device. For example, the display panel 52 and the control panel 53 are graphical user interface (GUI) components presented on a single touch screen display. In another embodiment, the display panel 52 and the control panel 53 are presented on separate interface devices. For example, the display panel 52 is presented on a first device, such as a display or wirelessly via a mobile device, and the control panel 53 is presented on a second device, such as a mechanical or digital input panel or wirelessly via a mobile device.

After one or more dimensions are determined, the weight estimation controller 51 uses the one or more dimensions and structure characteristic information to generate a weight estimate of the structure. The optical weight estimation system 51 allows an operator to rapidly analyze one or more mounted structures without having to unmount the structure from the setting or spend significant time and expertise identifying key dimensions required for weight calculations. The optical weight estimation system yields significant time savings as compared to known weight estimation techniques. Certain dimensions of a structure are not always visible or are challenging to identify. For example, in the case of mounted round brilliant gemstones, a prong setting covers portions of the diameter D 19 thereby introducing challenges in measuring this dimension required for accurate weight estimation.

Estimation equation 30 is replicated in FIG. 5 and includes labels explaining how system 50 significantly advances speed of structure analysis. In the case of gemstone carat weight or mass estimation, system 50 estimates length and width from an image using computer vision techniques and machine learning models. System 50 calculates depth and is preconfigured with adjustable correction factors. Operators update the correction factors via the control panel 53 as needed based on the sample structure under analysis. Operators supply structure characteristic information, such as shape, style and species in the case of gemstone analysis. It is appreciated that weight is but one type of calculation and system 50 is adaptable to estimate other characteristics of a structure from an image by configuring and appropriately training system 50.

Figure 6:
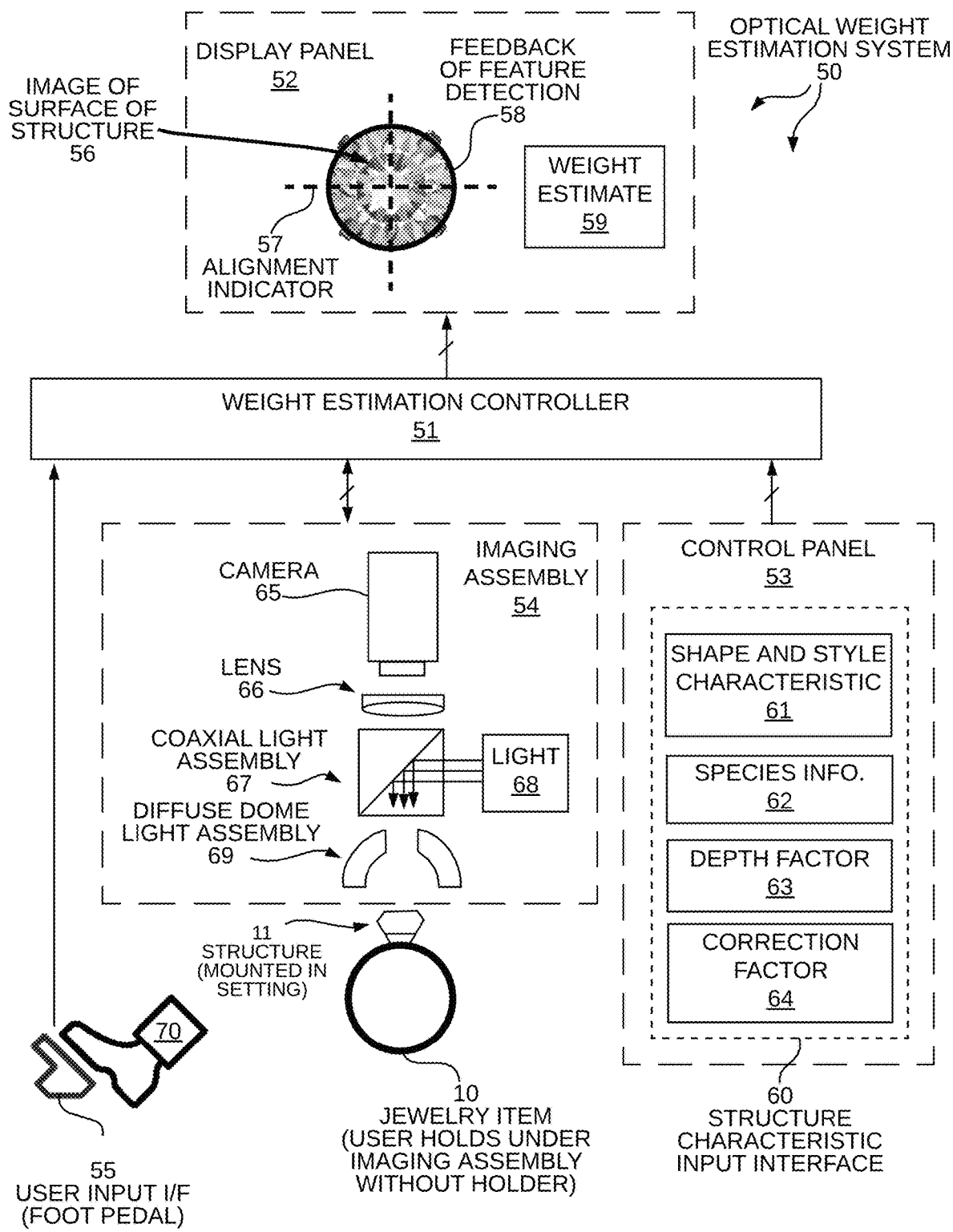
FIG. 6 is a detailed diagram of the optical weight estimation system 50.
Figure 15:
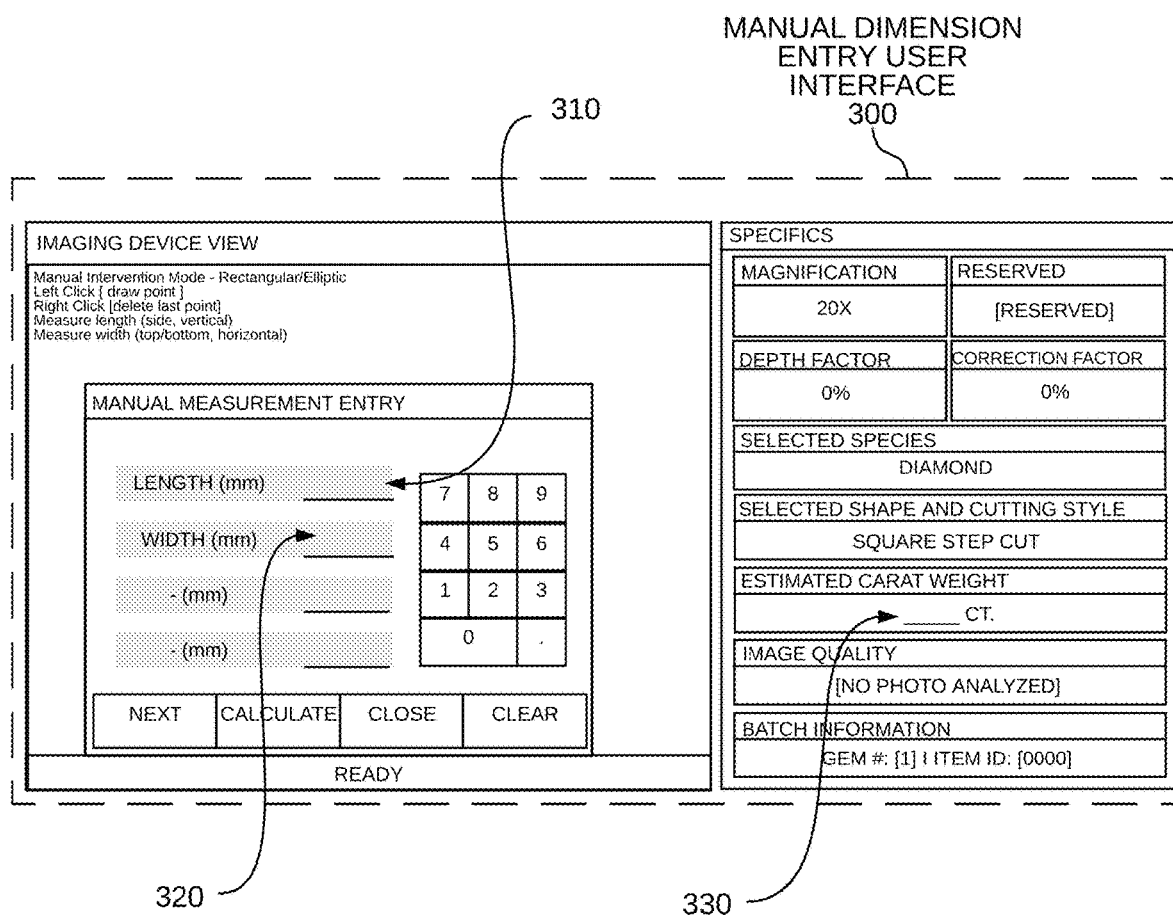
FIG. 15 is a diagram showing a manual dimension entry user interface 300 in accordance with one embodiment.

FIG. 6 is a detailed diagram of the optical weight estimation system 50. The display panel 52 displays an image 56 of a structure obtained using the imaging assembly 54, an alignment indicator 57, feedback 58 of a detected feature overlaid above the image 56, and a weight estimate 59 generated by the weight estimation controller 51. The control panel 53 comprises a structure characteristic input interface 60 that receives structure characteristic information via user input. The structure characteristic information includes shape and style characteristic information 61, species information 62, a depth factor 63, and a correction factor 64. The imaging assembly 54 comprises a camera 65, a lens 66, a coaxial light assembly 67, a light source 68, and a diffuse dome light assembly 69. Another example of an imaging assembly 200 is shown in FIG. 15 that includes zoom stages. In this example, the user input interface 55 is a foot pedal. The optical weight estimation system 50 is operable to estimate weight of any structure, including gemstones such as diamond 11.

In operation, an operator 70 positions jewelry item 10 beneath the imaging assembly 54. Display panel 52 displays image data output from the imaging assembly 54. The operator 70 uses the alignment indicator 57 to center and adjust the position and orientation of the jewelry item 10 to ensure an adequate image 56 of a top surface of the diamond 11 is obtained. Once the desired position and orientation of the diamond 11 is achieved, the operator 70 presses down on foot pedal 55. In response to detecting user input via the foot pedal 55, the weight estimation controller 51 captures image 56 of the diamond 11.

The weight estimation controller 51 uses image 56 to determine at least one dimension of the structure. This at least one dimension is used to determine the weight of the structure. In the case of diamond 11, the weight estimation controller 51 uses the image 56 to detect the diameter 19 and the table length 20, which are used to determine the weight of the gemstone as shown in equation 30 of FIG. 4. The structure characteristic information 61-64, including the shape, style, species, depth factor, and correction factor information, are also involved in generating the weight estimate 59 of the diamond 11.

The weight estimation controller 51 outputs feedback 58 and weight estimate 59 of the diamond 11. The feedback 58 is overlaid above the image 56 on the display panel 52. Operator 70 uses the feedback 58 in determining whether the image 56 was sufficient to generate a reliable weight estimate. In one example, feedback 58 is a circular graphic that identifies the diameter 19 of the diamond 11. If the circular graphic 58 does not align with an outer perimeter of the diamond 11, then the image 56 is likely insufficient for the weight estimation controller 51 to identify the diameter of the diamond 11, resulting in an unreliable weight estimate. If, on the other hand, the feedback 58 does align with the outer perimeter of the diamond 11, then the image 56 is likely sufficient for the weight estimation controller 51 to correctly identify the diameter 19 of the diamond 11, resulting in a reliable weight estimate.

The optical weight estimation system 50 estimates weight of a structure based on an image of a surface of a structure, such as a top surface of diamond 11, and on the structure characteristic information 61-64, such as the shape, style, species, depth factor, and correction factor information. The optical weight estimation system 50 performs weight estimation while the structure 11 is mounted in a setting. The weight estimation is performed without having to unmount the structure 11 from the setting.

The operator 70 obtains weight estimates of various mounted structures by handheld operation. The operator need not use any holder or specialized clamp to retain the jewelry item 10 below the imaging assembly 54. This handheld operation results in significant time savings, particularly where weight estimates are desired for more than one structure. For example, jewelry items often have more than one gemstone. The operator 70 uses the optical weight estimation system 50 to rapidly generate and store weight estimates for each gemstone on the jewelry item.

The foot pedal 55 provides significant time savings in generating weight estimations. A single operator is able to use their hands to reliably image a top surface of a structure and use their foot to capture the image for processing and weight analysis. No other user input is involved in estimating weight of the structure other than the structure characteristic information 61-64 and the foot pedal input 55.

Figure 7:
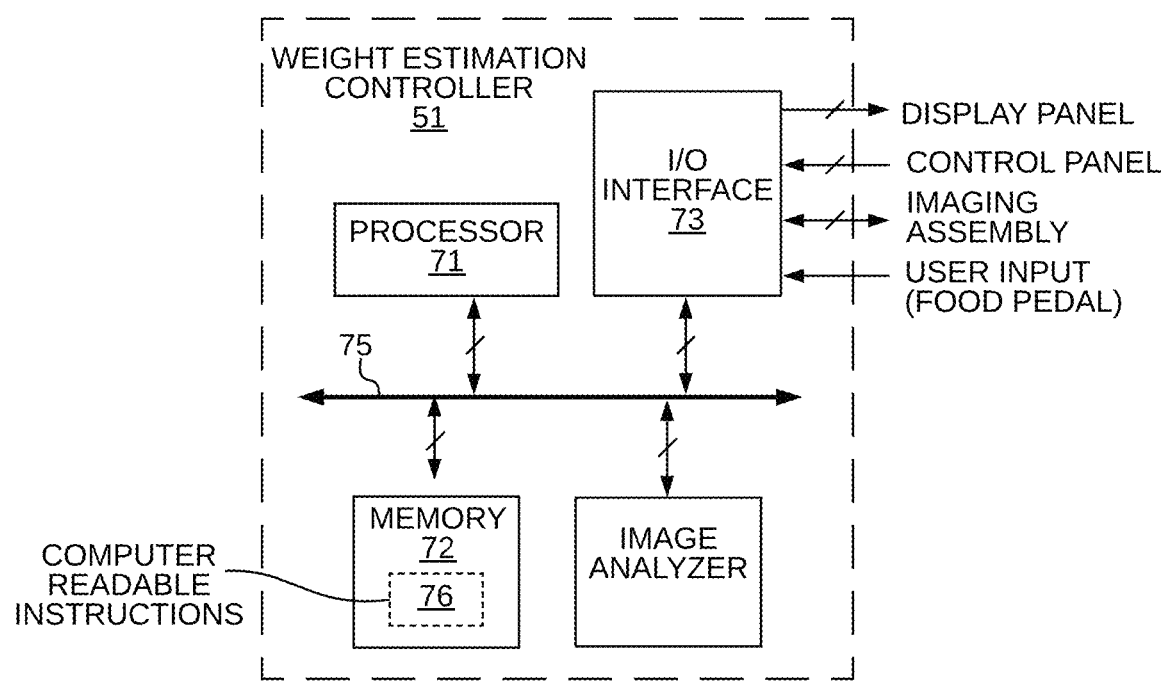
FIG. 7 is a detailed diagram of the weight estimation controller 51 in accordance with one embodiment.

FIG. 7 is a detailed diagram of the weight estimation controller 51 in accordance with one embodiment. The weight estimation controller 51 comprises a processor 71, a memory 72, an input/output interface 73, an image analyzer 74, and a communication bus 75. The processor 71 is any suitable processor capable of interpreting or executing instructions. The memory 72 is a computer-readable medium that includes any kind of computer memory such as floppy disks, conventional hard disks, CD-ROMS, Flash ROMs, non-volatile ROM, RAM, and non-volatile memory. The input/output interface 73 is any suitable hardware capable of interfacing with input or output devices, such as cameras, microphones, touch displays, keyboards, other mobile devices, networks, workstations, computers, and laptops. The input/output interface 73 interfaces with the display panel 52, the control panel 53, the imaging assembly 54, and user input 55. The image analyzer 74 is any suitable computational structure that analyzes images to detect at least one feature indicative of a dimension involved in performing weight estimation of a structure being imaged.

The processor 71 reads instructions 76 from memory 72 over data bus 75. Although the weight estimation controller 51 is shown as a single structure, it is appreciated that each of the processor 71, memory 72, and image analyzer 74 are operable in a single system or over a distributed system. For example, in a distributed system embodiment, at least one of the processor 71, memory 72, or image analyzer 74 is operating on a remote system and is accessible over a network.

Figure 8:
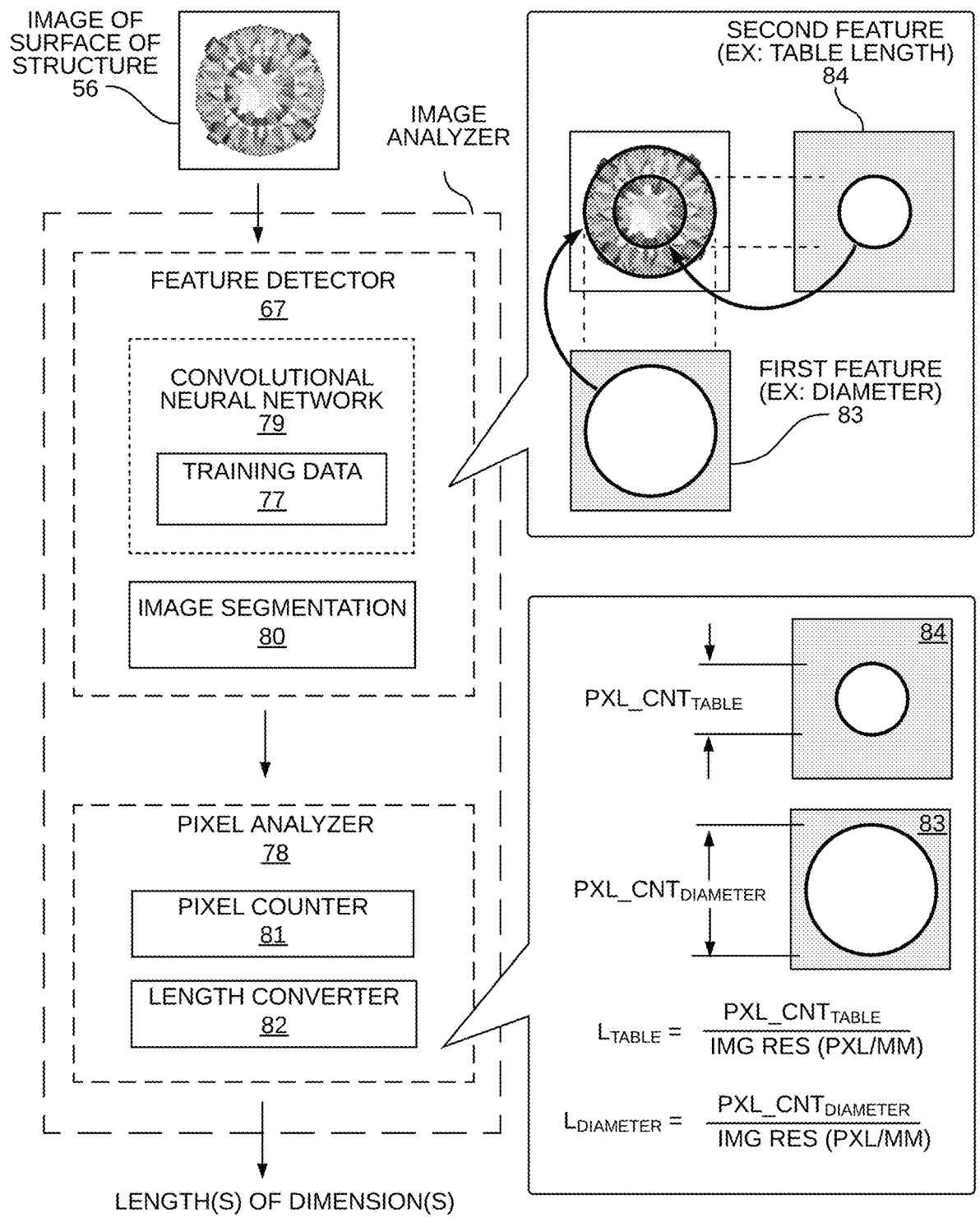
FIG. 8 is a detailed diagram of the image analyzer 74 in accordance with one embodiment.

FIG. 8 is a detailed diagram of the image analyzer 74 in accordance with one embodiment. The image analyzer 74 comprises a feature detector 67 and a pixel analyzer 78. The feature detector 67 includes a trained convolutional neural network 79 and an image segmentation block 80. The convolutional neural network 79 is trained via training data 77. The pixel analyzer 78 comprises a pixel counter 81 and a length converter 82. The image analyzer 74 uses images of a top surface of a structure obtained via the imaging assembly 54 to identify at least one feature indicative of a dimension involved in performing weight estimation of the structure.

In one embodiment, the feature detector 67 employs threshold-based segmentation and color clustering to identify at least one feature in the image 56. In another embodiment, the feature detector 67 employs semantic segmentation with a Convolutional Neural Network (CNN). It is understood that other image analysis techniques may be used in identifying features in image 56 indicative of at least one usable dimension in estimating weight. For additional information on the structure and operation of convolutional neural network 79 including how to construct and train convolutional neural network 79, and for additional information on the structure and operation of image segmentation block 80 including how to construct and use image segmentation block 80, see: U.S. Provisional Patent Application Ser. No. 63/260,278, entitled "Optical Weight Estimation System," filed on Aug. 15, 2021, by Page et al. (the entire subject matter of this patent document is hereby incorporated by reference).

During operation, the feature detector receives the image 67 of the top surface of the diamond 11. In this embodiment, the feature detector 67 uses the convolutional neural network 79 trained via training data 77 to identify one or more features. The convolutional neural network 79 is used to classify pixels. The image segmentation block 80 is used to differentiate gemstones from other gemstones in image 56 and to differentiate gemstones from other materials, such as metallic settings, in image 56. Reference numeral 83 identifies a first feature indicative of the diameter 19 of the diamond 11. Reference numeral 84 identifies a second feature indicative of the table length 20 of the diamond 11.

Next, the pixel counter 81 detects the number of pixels corresponding to at least one feature identified by feature detector 67. For example, the pixel counter 81 determines the number of pixels ($PXL\_CNT_{DIAMETER}$) in feature 83 corresponding to the diameter 19 and determines the number of pixels ($PXL\_CNT_{TABLE}$) in feature 84 corresponding to the table length 20. Next, the length converter 82 determines length of dimensions using the pixel counts identified by the pixel counter 81. The resolution of the image 56 indicates the number of pixels per millimeter. The resolution of the image 56 is known from camera setting configuration of camera 65.

Figure 9:
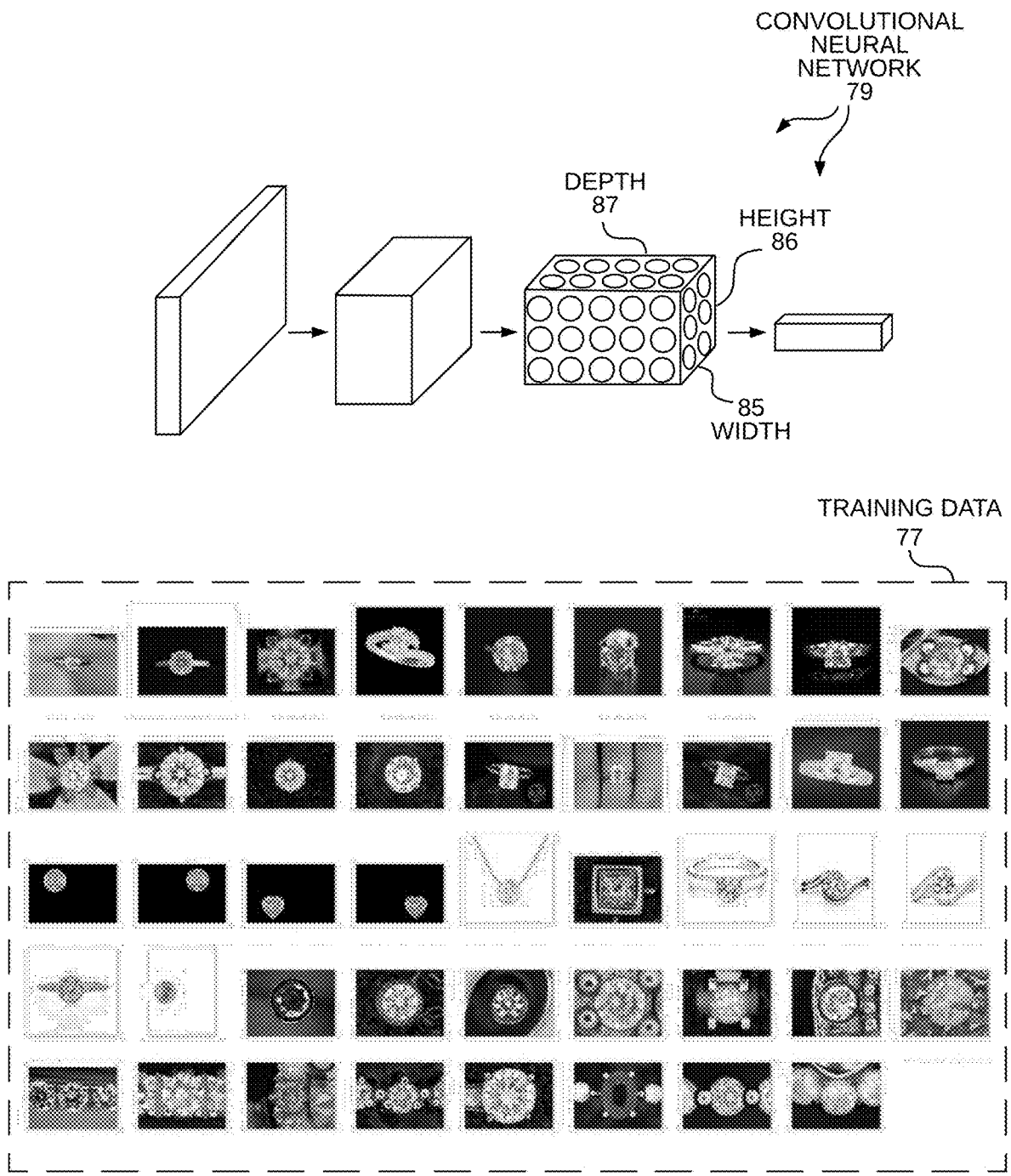
FIG. 9 is a diagram of a trained convolutional neural network 79 and training data 77 in accordance with one embodiment.

FIG. 9 is a diagram of a convolutional neural network 79 and training data 77 in accordance with one embodiment. The convolutional neural network 79 comprises a plurality of layers. The convolutional neural network 79 arranges its neurons in three dimensions, including width 85, height 86, and depth 87. Each layer of the convolutional neural network 79 transforms a three-dimensional input volume to a three-dimensional output volume of neuron activations. The convolutional neural network 79 is trained using training data 77. In this example, the training data 77 comprises images of gemstones in jewelry settings. Some images in training data 77 are obtained from online sources, while other images are obtained from digital imaging of jewelry items. It is appreciated that feature detector 67 may be improved by expanding training data 77 to include more images and/or higher quality images.

In other embodiments, training data 77 includes blurry images and dark images of structures to be analyzed. By adding blurry or dark images to the training data 77, the model is trained to recognize and detect boundaries of structures that are out of focus. For example, in the case of diamonds, training data 77 includes blurry images and dark images of diamonds. The trained model can track the sharpness and/or color of images at pixel levels. If there is a significant jump from background to diamond on detected color or sharpness, then the boundary of the diamond is identifiable. By adding blurry and/or dark images to the training data, the threshold of this jump is lowered, allowing the model to better identify diamonds or other gemstones in blurry and/or dark images.

In various embodiments, training data 77 includes images of structures in various setting styles. In the case of gemstones, images include gemstones set in the following settings: solitaire, prong, shared prong, pave, channel, bar, or other hybrid or derivative styles such as trellis (prong-style) or tension (channel/bar style). Training data 77 also includes colored gemstones and gemstones other than diamond, including sapphire, amethyst, ruby, and emerald gemstones. The training data 77 optionally includes cabochon stones to analyze dimensions and estimate weight of non-faceted structures.

In operation, training data 77 is updated with new training data thereby improving operation of system 50 over time. In one embodiment, images which system 50 is not able to successfully analyze are flagged and provided as new training data. If system 50 is not able to adequately detect a diameter feature in an image of a gemstone, then an operator manually intervenes and identifies the diameter in the image. Examples of manual intervention techniques are shown and explained in connection with FIGS. 15-19. Images that undergo manual intervention are flagged. Machine learning models within system 50, such as CNN 79, are periodically retrained with flagged image data. Performance of system 50 improves over time via continuous retraining of models with images system 50 did not adequately process initially.

Figure 10:
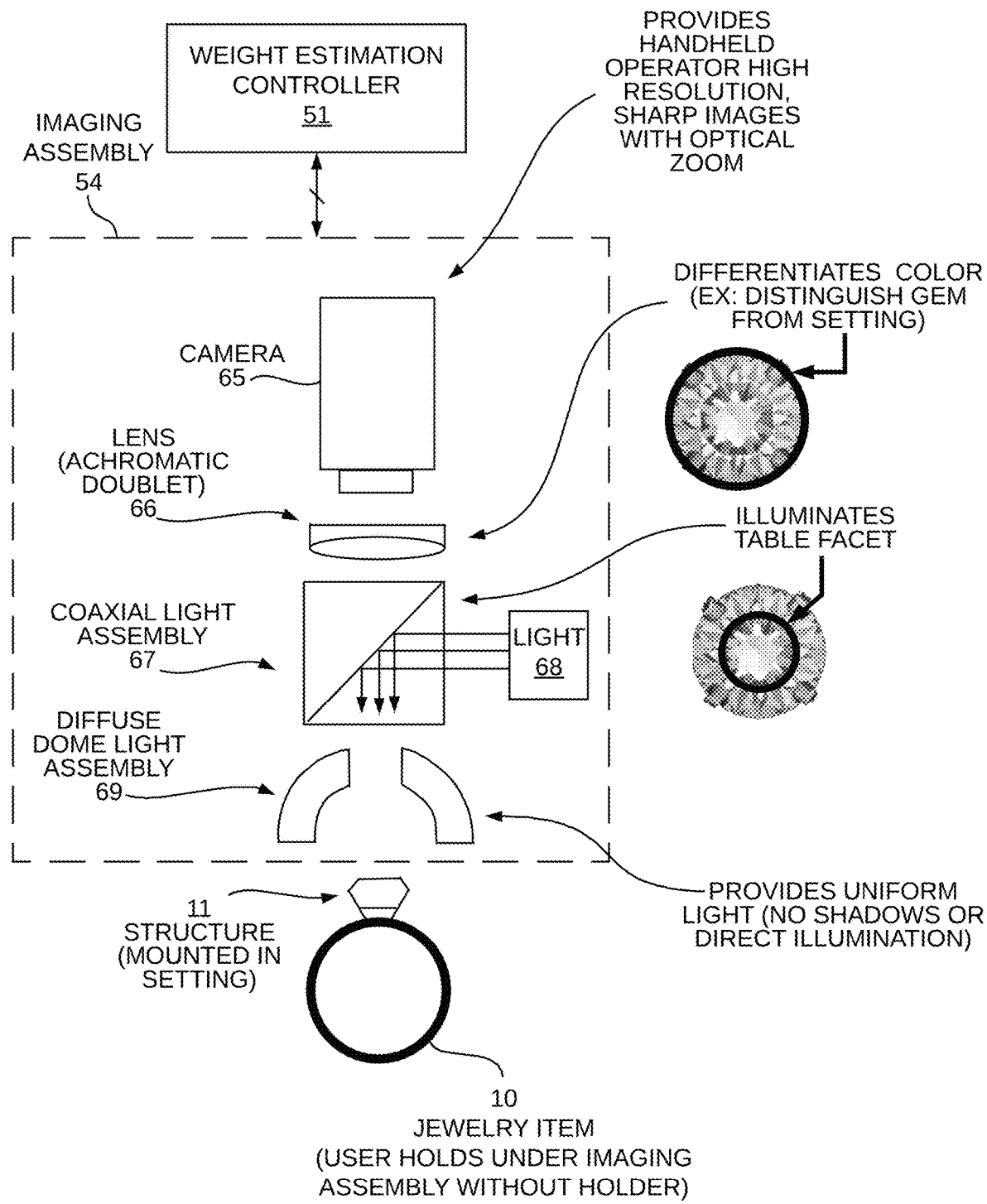
FIG. 10 is a detailed diagram of the imaging assembly 54.

FIG. 10 is a detailed diagram of the imaging assembly 54. The camera 65 captures images having sufficient resolution and sharpness for performing feature identification needed for weight estimation. In accordance with one novel aspect, the camera 65 is usable by a handheld operator. A shutter speed that is too fast will result in a darker image. A shutter speed that is too slow will introduce image distortion due to the shake of an operator's hand. It is appreciated that excessive magnification would render camera 65 unusable by handheld operators due to inherent shaking introduced via a user's hand. In accordance with another novel aspect, the camera 65 employs optical zoom for faster processing as compared to digital zoom. In this example, the camera 65 is a GigE color zoom camera having part number DFK Z30GP031 and commercially available from The Imaging Source, LLC, having a business address at 6926 Shannon Willow Rd., Suite 400, Charlotte, NC 28226.

In this embodiment, lens 66 is an achromatic doublet. The achromatic doublet 66 includes a first lens and a second lens formed from different types of glass with varying dispersion. The achromatic doublet 66 provides for color differentiation, which is particularly useful in distinguishing the gemstone from the setting. A sharp image is important for obtaining an accurate weight estimation. In this example, the achromatic doublet 66 has a 125-mm focal length and is available from Thorlabs Inc., having a business address of 56. Sparta Avenue, Newton, New Jersey 07860 and having the part number AC508-125-A-ML.

The coaxial light assembly 67 and the diffuse dome assembly 69 illuminate the structure being analyzed. In this example, the coaxial light assembly 67 supplies light 68 directly onto the table facet 17 of diamond 11. This provides for improved illumination of the table facet 17 so that the table length 20 is more precisely estimated from image 56. The diffuse dome assembly 69 supplies uniform light to diamond 11 without directly illuminating diamond 11. The diffuse dome assembly 69 minimizes presentation of shadows in images generated by the imaging assembly 54. In this example, an 87-mm, 5.8-Watt white dome light is available from Keyence Corporation Of America, having a business address of 500 Park Boulevard, Suite 200, Itasca, IL 60143 and having the part number CA-DDW8. A Broadband Halogen coaxial light is available from Thorlabs Inc. and has part number QTH10. A 50:50 beamsplitter with ground glass diffuser of 600 grit is available from Thorlabs Inc. and has part numbers EBS2 and DG20-600. A dampening breadboard and damped post are available from Thorlabs Inc. and have part numbers B1218FX and DP14A.

Figure 11:
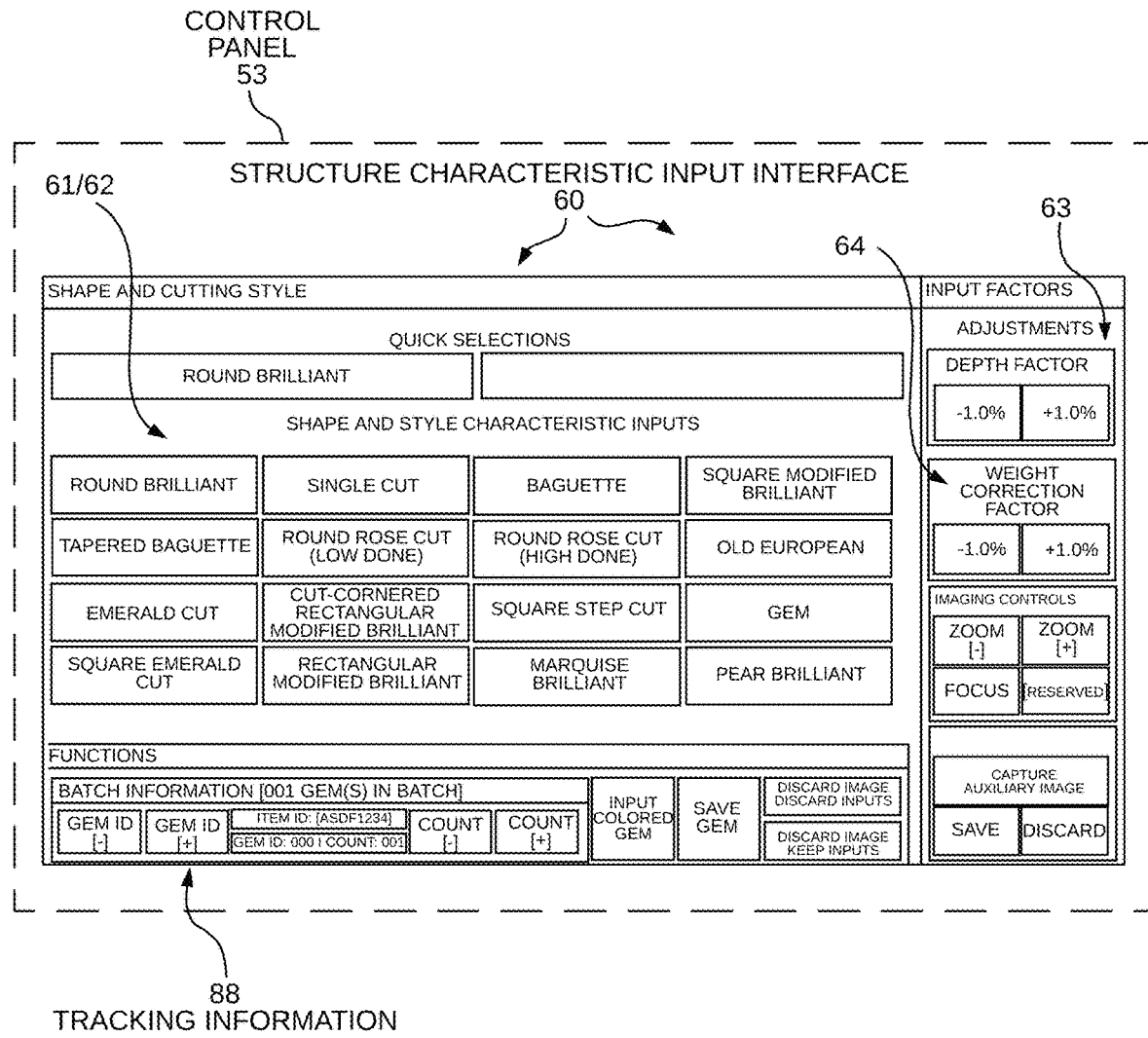
FIG. 11 is a diagram of the control panel 53 in accordance with one embodiment.

FIG. 11 is a diagram of the control panel 53 in accordance with one embodiment. The structure characteristic input interface 60 receives shape and style characteristic information 61, structural species information 62, a depth factor 63, and a correction factor 64. The structure characteristic information 61 is supplied by operator 70 onto the input interface 60. Tracking information 88 is optionally received onto control panel 53. Tracking information 88 is usable for record-keeping and tracking of processed structures. In the case of jewelry, many jewelry items have multiple gemstones. The weight estimation controller 51 is operable to maintain records of aggregate and individual weight estimations of all gemstones associated with each jewelry item.

Figure 12:
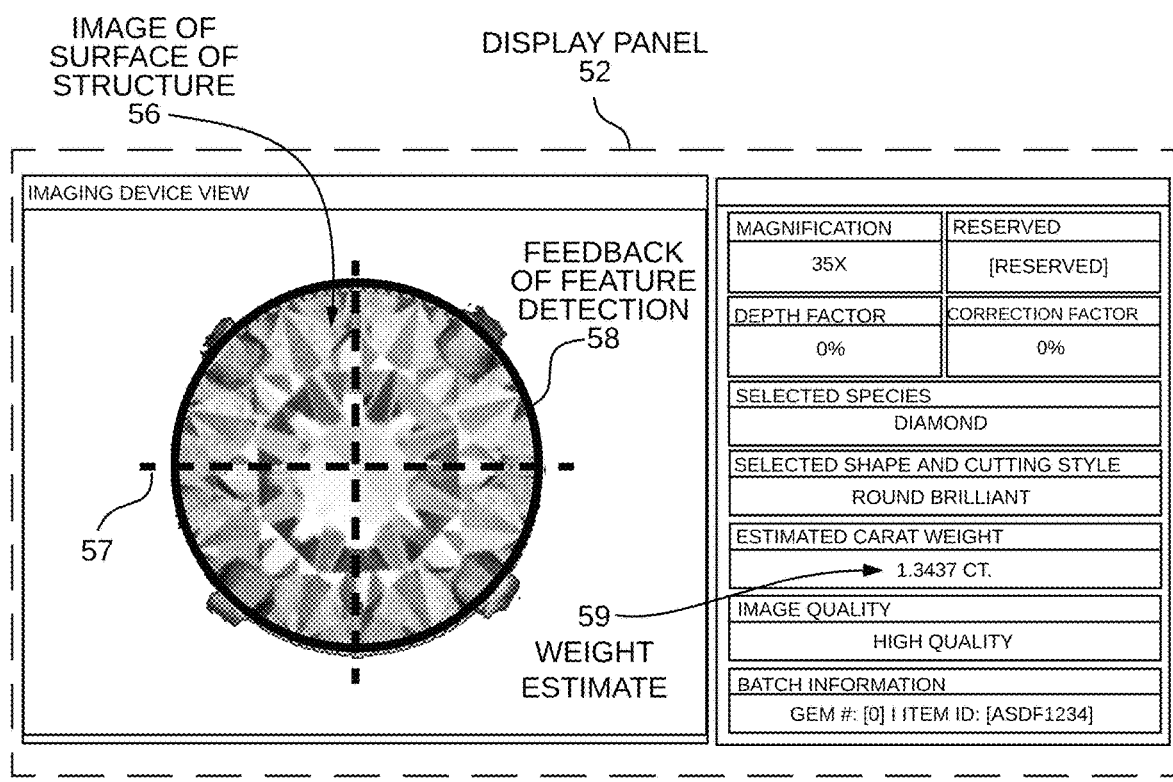
FIG. 12 is a diagram of the display panel 52 in accordance with one embodiment.

FIG. 12 is a diagram of the display panel 52 in accordance with one embodiment. The display panel 52 displays an image 56 of a structure obtained using the imaging assembly 54. In this example, image 56 is obtained and shows a top surface of diamond 11. The alignment indicator 57 assists operator 70 in obtaining a usable image. Feedback 58 of a detected feature is overlaid above the image 56. Feedback 58 identifies at least one feature identified by weight estimation controller 51. The weight estimate 59 generated by the weight estimation controller 51 is presented on display panel 52.

Figure 13:
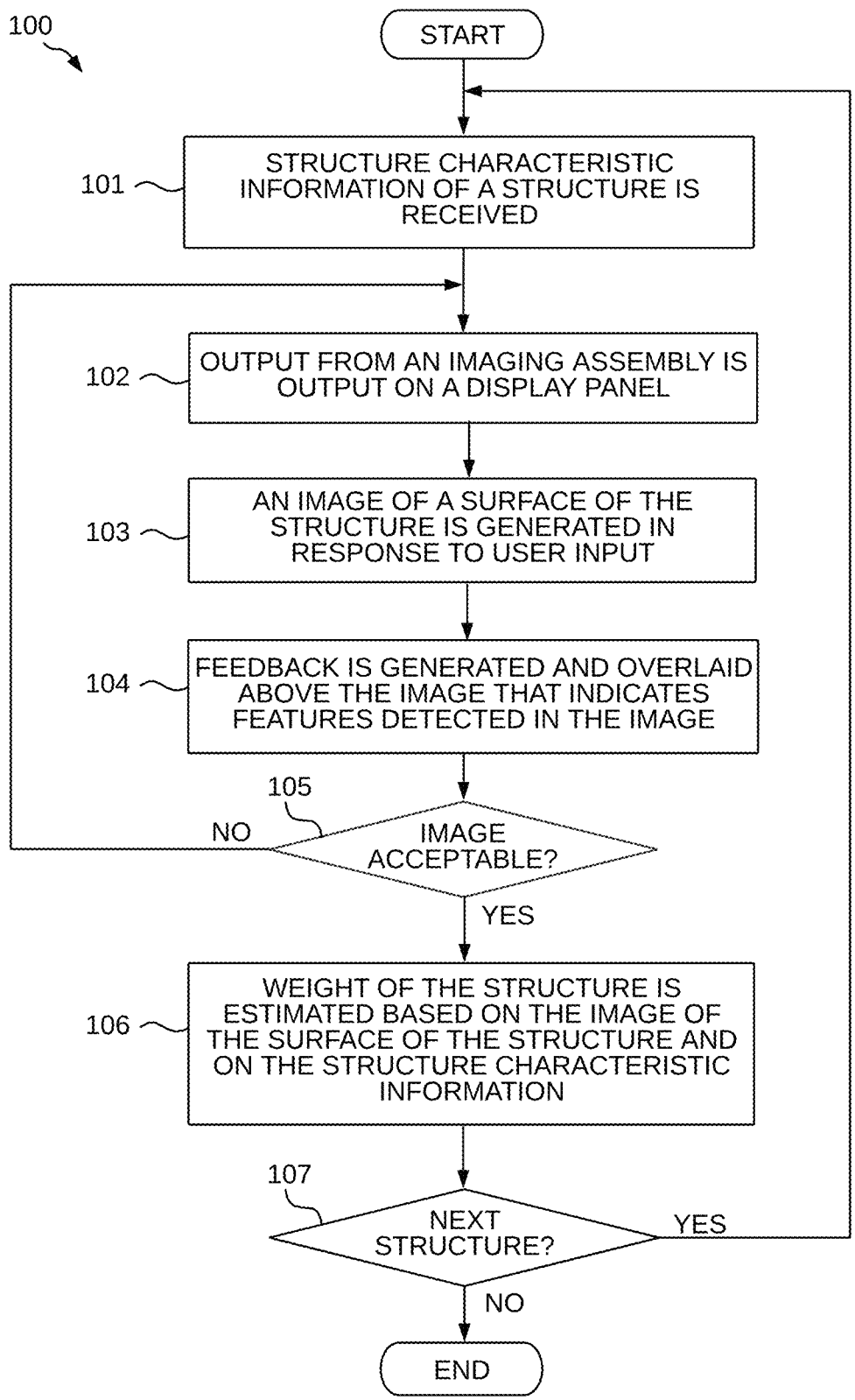
FIG. 13 is a flowchart of a method 100 in accordance with another novel aspect.

FIG. 13 is a flowchart of a method 100 in accordance with another novel aspect. In a first step (Step 101), the structure characteristic information of a structure is received. In the example of FIG. 11, an operator 70 uses control panel 53 to supply the structure characteristic information via the structure characteristic input interface 60. The structure characteristic information includes shape and style characteristic information 61, structural species information 62, depth factor 63, and correction factor 64. The structure characteristic information is received onto the weight estimation controller 51.

In a second step (Step 102), output from an imaging assembly is output on a display panel. Imaging data obtained by the imaging assembly is presented in real time on the display panel. For example, in the embodiment of FIG. 12, the weight estimation controller 51 outputs real-time imaging of the diamond 11 obtained from imaging assembly 54 onto the display panel 52. The operator 70 uses the output to align and center the diamond 11.

In a third step (Step 103), an image of a surface of the structure is generated in response to user input. For example, in FIG. 6, operator 70 presses down on foot pedal interface 55. In response, an image 56 of a top surface of diamond 11 is captured.

In a fourth step (Step 104), feedback is generated and overlaid above the image that indicates features detected in the image. For example, in FIG. 6, feedback 58 is overlaid above the image 56 and identifies a diameter 19 of the diamond 11. In other embodiments, more than one feedback graphic is overlaid on the image 56.

In a fifth step (Step 105), a determination is made as to whether the image is acceptable. If it is determined that the image is acceptable, then the method proceeds to block 106. If, on the other hand, it is determined that the image is not acceptable, then the method proceeds to block 102. For example, in FIG. 6, if the operator 70 determines that the circle 58 correctly identifies an outer boundary of the diamond 11, then the operator 70 may choose to accept the image 56 of the top surface of the diamond 11. On the other hand, if the operator 70 determines that the circle 58 does not correctly identify the outer boundary of the diamond 11, then the operator 70 may choose to obtain a new image of the diamond 11 to be used for weight estimation.

In a sixth step (Step 106), weight of the structure is estimated based on the image of the surface of the structure and on the structure characteristic information. In the example of FIG. 12, weight estimation controller 51 generates and displays the weight estimate 59 on the display panel 52. The weight estimation controller 51 uses the structure characteristic information received via user input and lengths of at least one dimension obtained via image analysis performed via the image analyzer 74.

In a seventh step (Step 107), a determination is made as to whether or not there is another next structure to be analyzed. If there is another structure to be analyzed, then the method 100 proceeds to the beginning step 101. If there is no next structure to be analyzed, then the method 100 is done. For example, in FIG. 6, ring 10 has only diamond 11 and the operator 70 will be done after weight estimation 59 is generated. However, if ring 10 had more than one gemstone, then operator 70 is able to obtain weight estimates for all remaining gemstones using the optical weight estimation system 50.

Figure 14:
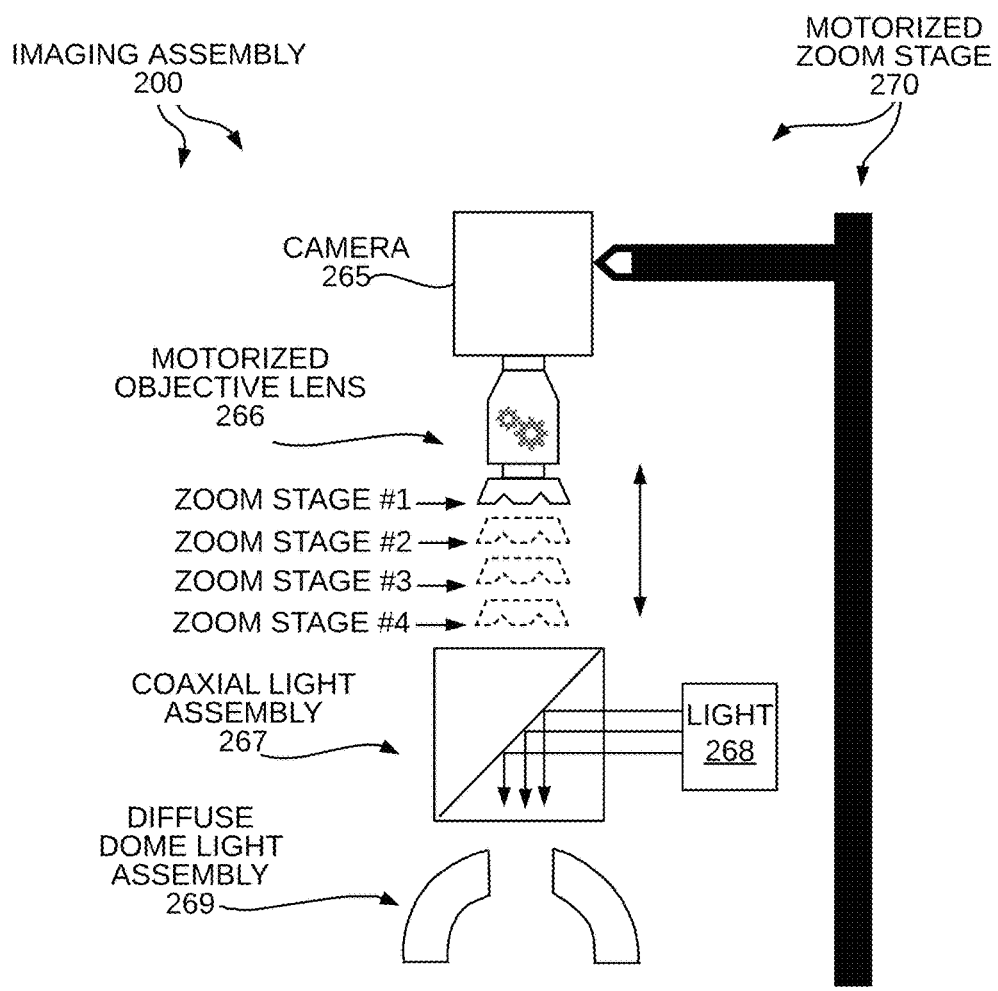
FIG. 14 is a detailed diagram of an imaging assembly 200 in accordance with another embodiment.

FIG. 14 is a detailed diagram of an imaging assembly 200 in accordance with another embodiment. The imaging assembly 200 provides automated, variable magnification functionality. The imaging assembly 200 streamlines operation without needing to manually modify the magnification or zoom setting. The imaging assembly 200 is operable to obtain high-resolution images of a structure that are usable to determine dimensions of the structure. The imaging assembly 200 is able to obtain high-resolution images of structures having a range of sizes. In the context of gemstones, the imaging assembly 200 obtains high-resolution images of small gemstones and large gemstones without requiring an operator to manually modify the magnification or zoom setting of the imaging assembly 200.

Figure 29:
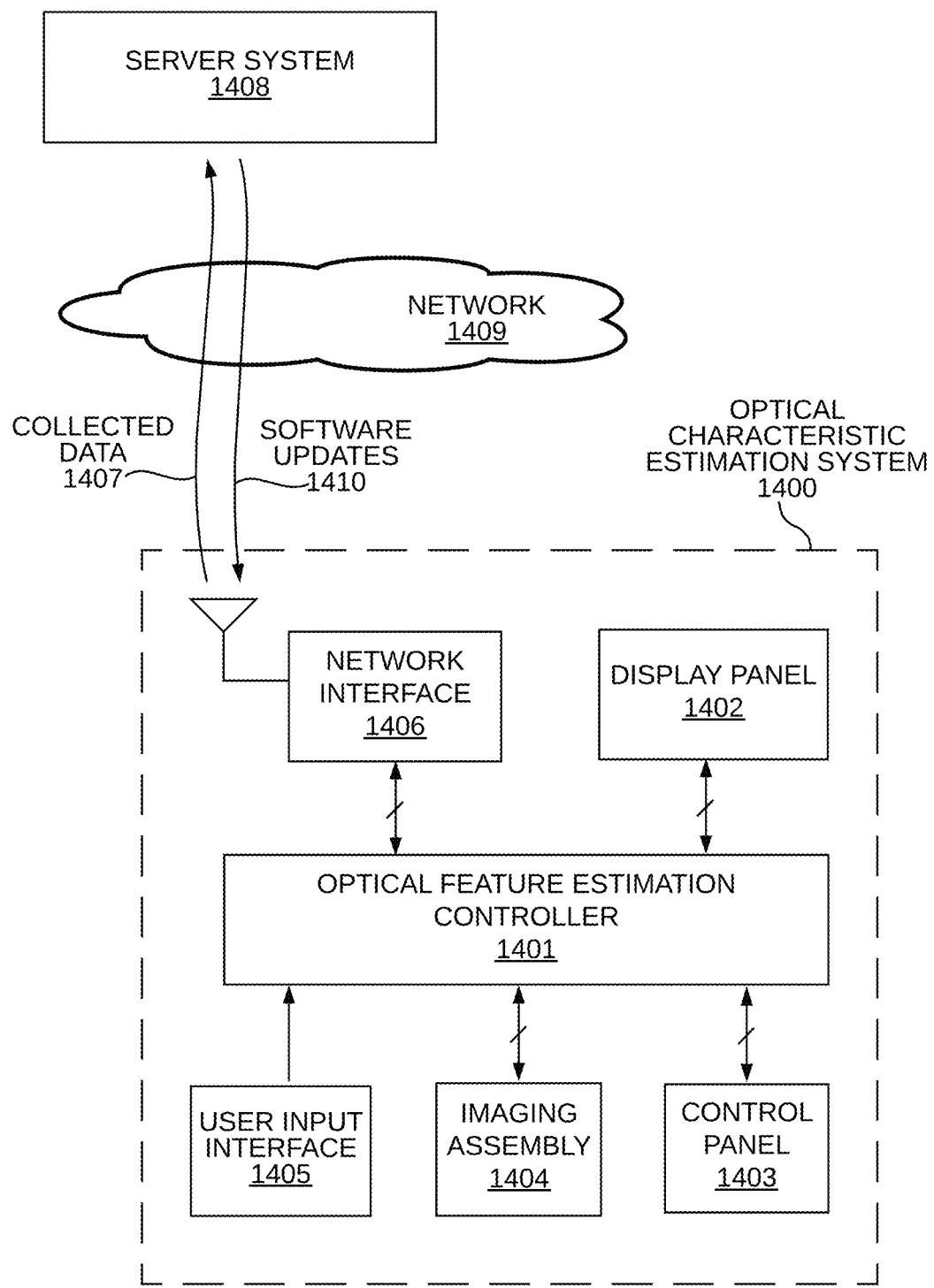
FIG. 29 is a diagram showing an embodiment of an optical characteristic estimation system 1400.

In one embodiment, the imaging assembly 200 provides image data to an estimation controller, such as the weight estimation controller 51 of FIG. 6 or an estimation controller 1401 of FIG. 29. The imaging assembly 200 comprises a camera 265, a motorized objective lens 266, a coaxial light assembly 267, a light source 268, a diffuse dome light assembly 269, and a motorized zoom stage 270. The imaging assembly 200 provides zoom functionality that controls a distance between the lens 266 via motorized zoom stage 270 and controls the magnification of lens 266. In operation, an operator selects one of several zoom stages via a mechanical or digital interface. The imaging assembly 200 automatically moves the lens 266 to the desired zoom stage and adjusts the magnification of lens 266 such that the structure is in focus.

The imaging assembly 200 provides four selectable zoom stages, including zoom stage #1, zoom stage #2, zoom stage #3, and zoom stage #4. In zoom stage #1, lens 266 and camera 265 are furthest from the structure being imaged and are fully zoomed out. In zoom stage #4, lens 266 and camera 265 are closest to the structure being imaged and are fully zoomed in. It is appreciated that the zoom stages are configurable and zoom ranges and mechanisms vary across various embodiments.

The motorized zoom stage 270 comprises a long-travel motorized linear stage available from Standa, a stepper and DC motor controller available from Standa, DC and Stepper motors available from Standa, Vertical Bracket for Breadboards available from Thorlabs and having part number VB01B, Square Construction Rail available from Thorlabs and having part number XE25L20, UltraLight Series II Breadboard available from Thorlabs and having part number PBG12102, and Breadboard Mounting Feet available from Thorlabs and having part number BMF4.

The camera 265 comprises a GigE color zoom camera available from Imaging Source, a GigE color industrial camera available from Imaging Source, and a Stage Micrometer with 50 m Divisions available from Thorlabs and having part number R1L3SP.

The motorized objective lens 266 comprises Body Tubes-Motorized available from Navitar, 12X Controllers and Power Supplies available from Navitar, Extension Tubes available from Thorlabs and having part number MVL067A, C-Mount Adapter available from Thorlabs and having part number MVLCMC, Right-Angle Bracket available from Thorlabs and having part number CAM1, SM1 Retaining Ring available from Thorlabs and having part number SM1RR-P10, Mounting Base available from Thorlabs and having part number BA1-P5, Black-Oxide 18-8 Stainless Steel Washer available from McMaster, and Adapter with External SM1 Threads and Internal M27×0.75 Threads available from Thorlabs having part number SM1A17.

The diffuse dome light assembly 269 comprises a White Dome Light available from Keyence and having part number CA-DDW8, Power Supply AC Adapter available from Amazon, Lens Mount with SM2 Internal Threads and No Retaining Lip available from Thorlabs and having part number SMR2, Ø1/2" Optical Post available from Thorlabs and having part number TR8, Right-Angle Clamp available from Thorlabs and having part number RA90, and Ø1/2" Optical Post available from Thorlabs and having part number TR4.

The coaxial light assembly 269 comprises Non-Polarizing Beamsplitter Cube available from Thorlabs and having part number BS025, Compact Clamping 4-Port Prism/Mirror available from Thorlabs and having part number CCM1-4ER, Unmounted N-BK7 Ground Glass Diffuser available from Thorlabs and having part number DG20-120, Cage Plate Adapter available from Thorlabs and having part number LCP6X, 60 mm Cage Plate available from Thorlabs and having part number LCP6S, 60 mm Cage Plate with 02.2 available from Thorlabs and having part number LCP09, Quartz Tungsten-Halogen Lamp available from Thorlabs and having part number QTH10, Cage Assembly Rod, ¼" Long available from Thorlabs and having part number ER025, Cage Assembly Rod, 2" Long available from Thorlabs and having part number ER2-P4, Cage Assembly Rod, 1.5" Long available from Thorlabs and having part number ER1.5-P4, and Externally SM1-Threaded End Cap for Machining available from Thorlabs and having part number SM1CP2M.

The imaging assembly 200 includes additional miscellaneous parts and components, including Hinge Lever Momentary Push Button Micro Limit Switch available from Amazon, JUXINICE 2PCS DB9 Female adapters DIY available from Amazon, Belkin Power Strip Surge Protector available from Amazon and having part number BE112230-08, Accell USB 3.0 Universal Docking station available from Amazon, Cudy POE200 30 W Gigabit PoE Injector Adapter available from Amazon, and J-B Weld 8276 Kwik-Weld Quick Setting Steel Reinforced Epoxy available from Amazon. It is appreciated that other embodiments of imaging assembly involve different components than those described here and yet still generate sufficient images for analysis by system 50. For additional information on the structure and operation of imaging assembly 200, including how to obtain and assemble various components of the imaging assembly 200, see: U.S. Provisional Patent Application Ser. No. 63/322,215, entitled "Optical Weight Estimation System," filed on Mar. 21, 2022, by Page et al. (the entire subject matter of this patent document is hereby incorporated by reference).

FIG. 15 is a diagram showing a manual dimension entry user interface 300 in accordance with one embodiment. The manual dimension entry user interface 300 is optionally provided with the optical weight estimation system 50 shown in FIG. 6 or optical characteristic estimation system 1400 shown in FIG. 29. The manual dimension entry user interface 300 provides an interface such that an operator is able to input dimensions for structures manually. In the example shown in FIG. 15, interface 300 includes a length dimension input 310 and a width dimension input 320. After dimensions have been entered by the user, the system 50 (or system 1400) calculates and displays information, such as the carat weight 330 in interface 300.

The manual dimension entry user interface 300 is particularly useful in operating conditions in which the optical weight estimation system 50 is unable to obtain precise dimensions for a structure being imaged. By providing manual entry functionality, the optical weight estimation system 50 ensures that the operator is able to continue to record dimension and weight information using system 50 even when operating conditions do not provide for ready determination of dimensions of certain structures.

Figure 16:
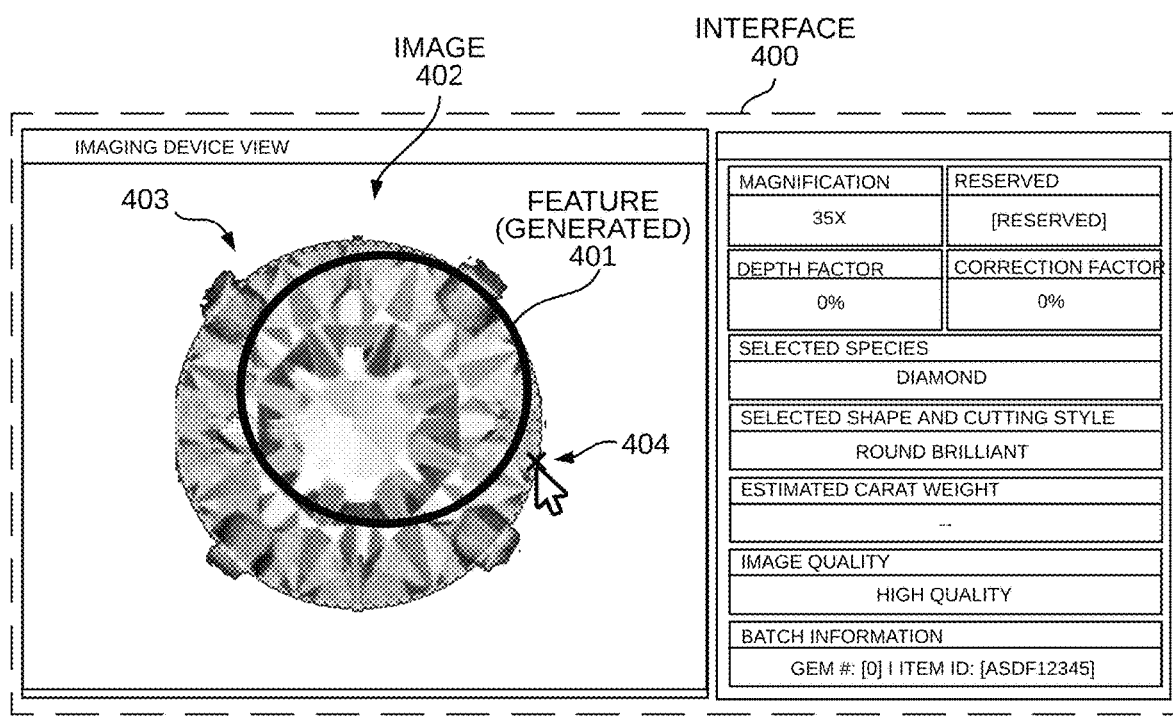
FIG. 16 is a diagram showing a user interface 400 that allows an operator to select points on an image of a structure via a display and estimate dimensions of the structure based on the selected points.

FIG. 16 is a diagram showing a user interface 400 that allows an operator to select points on an image of a structure via a display and estimate dimensions of the structure based on the selected points. The user interface 400 is an optional feature provided in the optical weight estimation system 50 shown in FIG. 6 or the optical characteristic estimation system 1400 shown in FIG. 29. The user interface 400 detects points input via a user input device such as a mouse or touch display.

In operation, the user interface 400 provides a mechanism for an operator to manually intervene when contours or features are not detected correctly. In one embodiment, after an operator rejects the detected features in an image and selects the correct feature, the image is flagged. Flagged images are used to routinely train various machine learning models employed by the system, such as segmentation models shown in FIGS. 9 and 21. Over time, the accuracy of these machine learning models is improved as more training data is obtained.

In this example, the optical weight estimation system generates a feature 401 that indicates edges of the structure 403 in the image 402. In this case, the generated feature 401 does not accurately reflect edges of the structure 403 as shown in image 402. Use of feature 401 would result in an imprecise weight estimation. To obtain an accurate measurement, the operator supplies at least three points via user interface 400 to identify edges of the structure 403. For example, the operator selects a first point 404 identifying one point along an edge of the structure 403 shown in the image 402.

Figure 17:
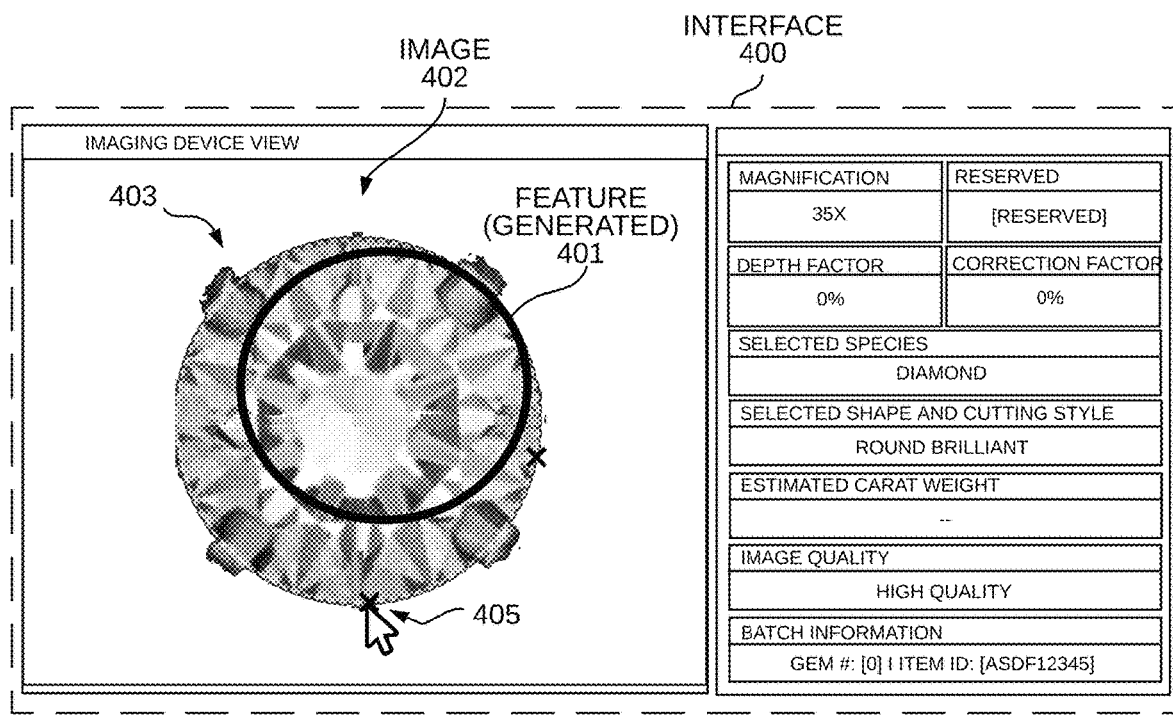
FIG. 17 is a diagram showing the operator selecting a second point 405 via user interface 400.

FIG. 17 is a diagram showing the operator selecting a second point 405 via user interface 400. The second point 405 identifies a second point along the edge of the structure 403 shown in the image 402.

Figure 18:
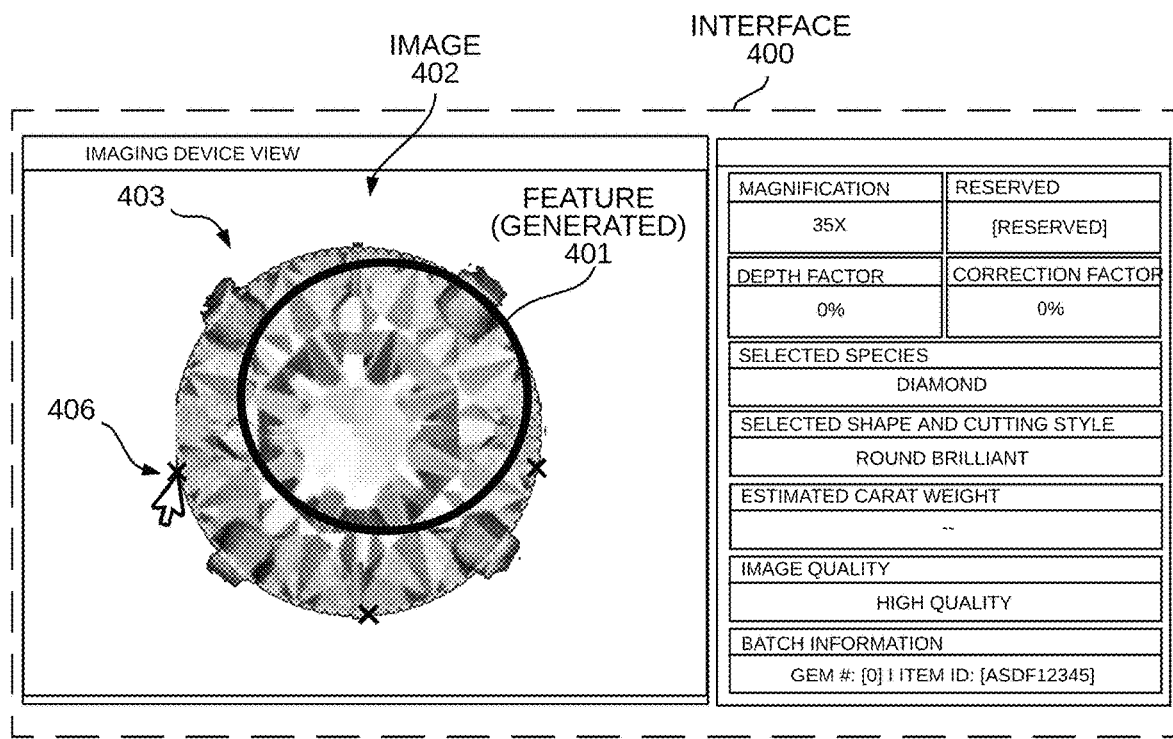
FIG. 18 is a diagram showing the operator selecting a third point 406 via user interface 400.

FIG. 18 is a diagram showing the operator selecting a third point 406 via user interface 400. The third point 406 identifies a third point along the edge of the structure 403 shown in the image 402.

Figure 19:
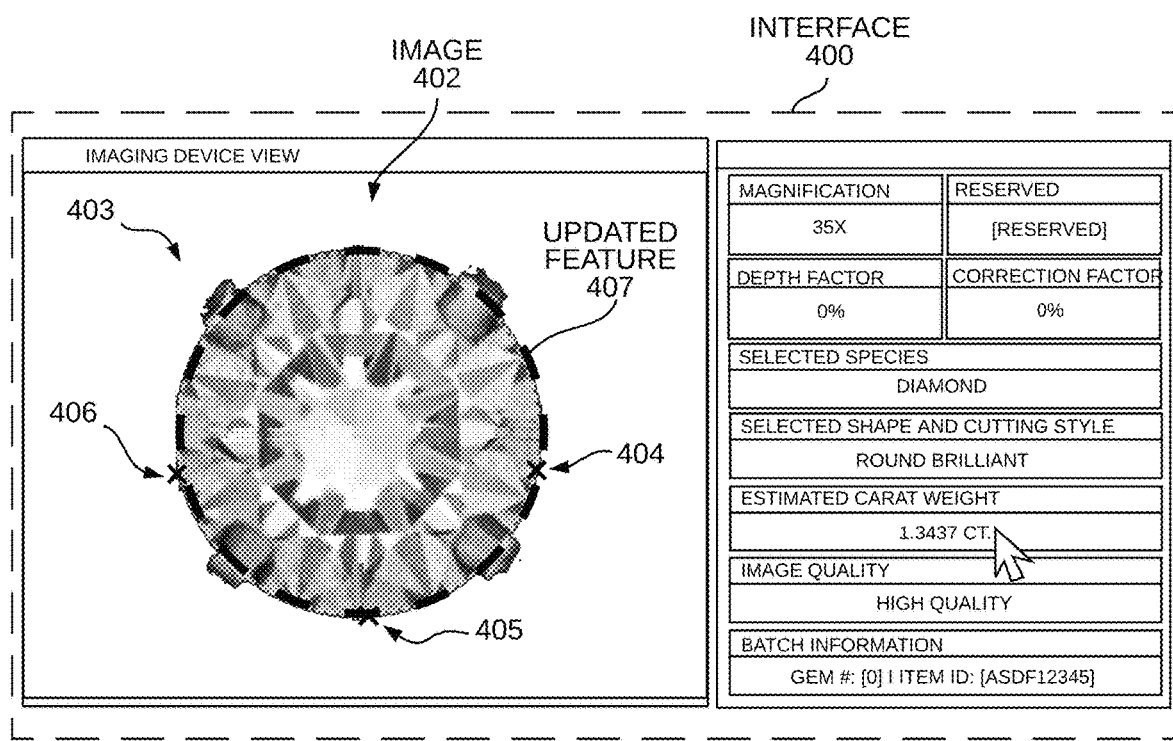
FIG. 19 is a diagram showing how the three points input via user interface 400 are used in generating an updated feature 407 of the structure.

FIG. 19 is a diagram showing how the three points input via user interface 400 are used in generating an updated feature 407 of the structure. The updated feature 407 is used to perform weight estimation of the structure 403 from the image 402.

Figure 20:
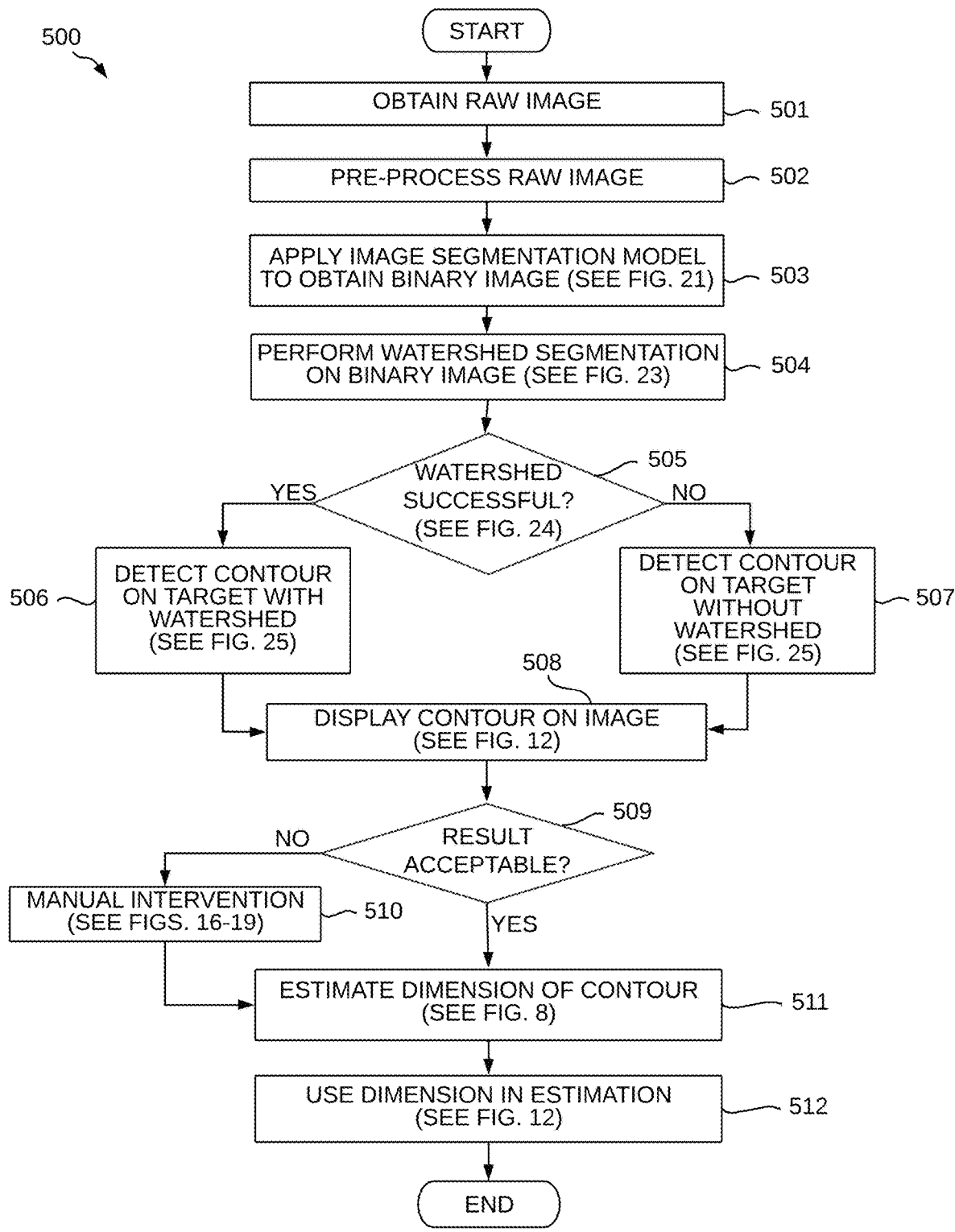
FIG. 20 is a flowchart of a method 500 for estimating weight of a structure based on one or more images of the structure.

FIG. 20 is a flowchart of a method 500 for estimating weight of a structure or other characteristics of the structure, such as density or volume, based on one or more images of the structure. The method 500 is performed by any suitable processing hardware operable to receive and process images. In one embodiment, the method 500 is performed by a weight estimation controller, such as the weight estimation controller 51 shown in FIG. 5. In a first step (Step 501), an image of a structure is obtained. The image assembly 54 shown in FIG. 10, imaging assembly 200 shown in FIG. 14, imaging assembly 1404 shown in FIG. 29, imaging assembly 1525 shown in FIG. 30, or another imaging device operable to capture images of a surface of a structure is used to obtain one or more images. Such images are also referred to as "raw" or "unprocessed" images. In the case of gemstone analysis, an image of a top surface of one or more mounted gemstones is obtained.

Figure 21:
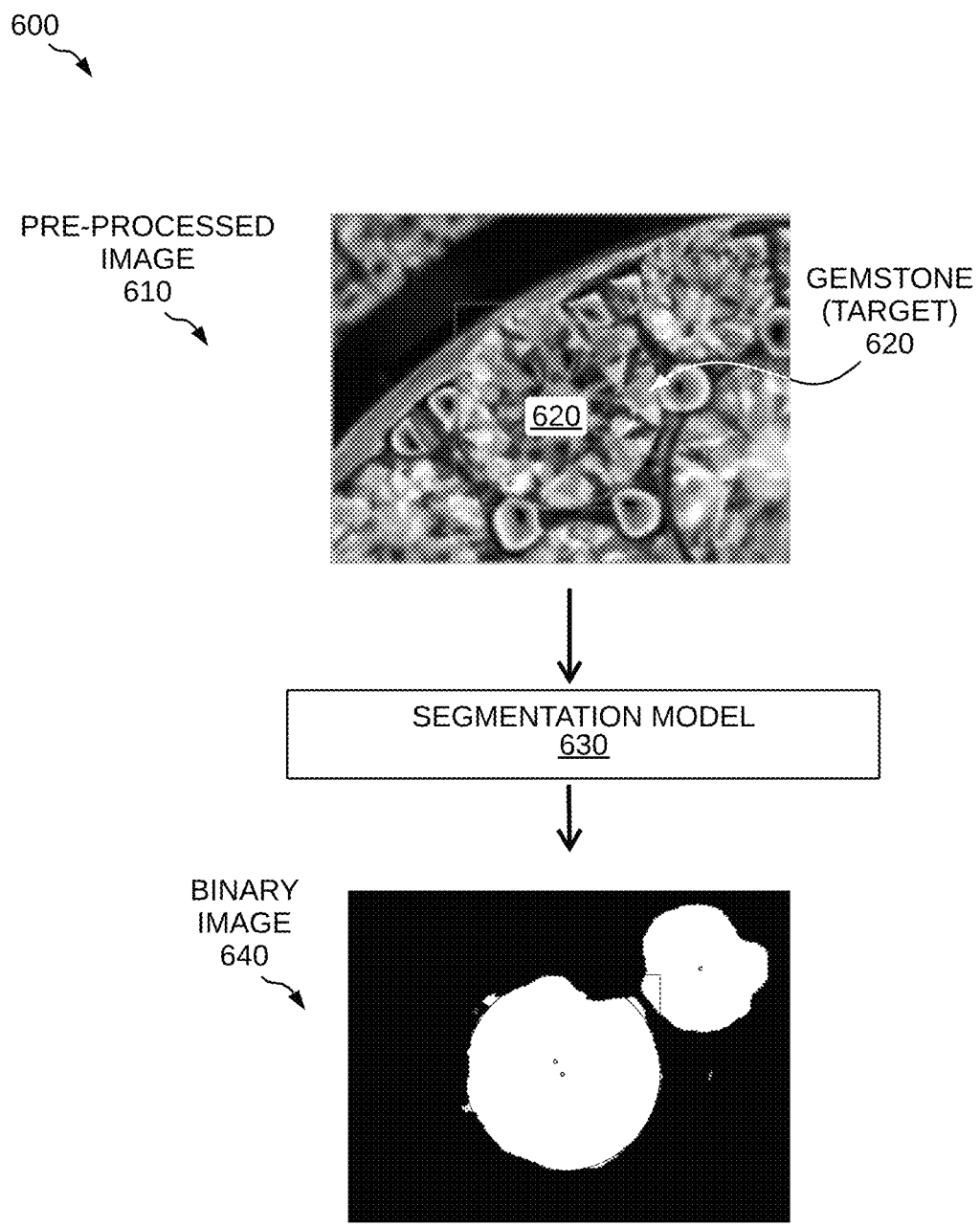
FIG. 21 is a diagram showing a segmentation model 630 that converts raw or pre-processed images to two-dimensional binary images.

In a second step (Step 502), the obtained image is pre-processed. Pre-processing involves resizing, centering, recropping, and performing other preprocessing steps to ensure the image is sufficient for further analysis. During pre-processing, the structure captured in the image is centered within the image. If the image is determined not to contain a structure, then the image is discarded. Pre-processing ensures that the image is usable to perform further weight estimation analysis. In the example of FIG. 21, pre-processed image 610 is generated from a raw image (not shown). The raw image shows a gemstone 620 at a center of the pre-processed image 610.

In applications where the structure being imaged is a gemstone, if no gemstone is detected in the image, then the image is discarded. For example, an operator of the weight estimation system 50 uses image assembly 54 of FIG. 10 or imaging assembly 200 of FIG. 14 to obtain an image of a mounted gemstone. In the example shown in FIG. 5, the weight estimation controller 51 pre-processes the image for weight estimation. If the weight estimation controller 51 determines that no gemstone is detected in the image, then the image control panel 53 notifies the user that the image is not usable and to retake an image of the desired gemstone.

In a third step (Step 503), binary images are obtained using a segmentation model. The binary image includes pixels having one of two pixel values. A first of the two pixel values represents a structure being analyzed. A second of the two pixel values represents a background surrounding the structure being analyzed. For example, the first of the two pixel values represents a white color (255,255,255) and the second of the two pixel values represents a black color (0,0,0). In cases where the optical weight estimation system is used to analyze mounted gemstones, white pixels represent a gemstone and black pixels represent everything else, including background, prongs, holders, and other aspects that introduce noise and should be disregarded. In the example of FIG. 21, a binary image 640 is generated from preprocessed image 610.

Figure 22:
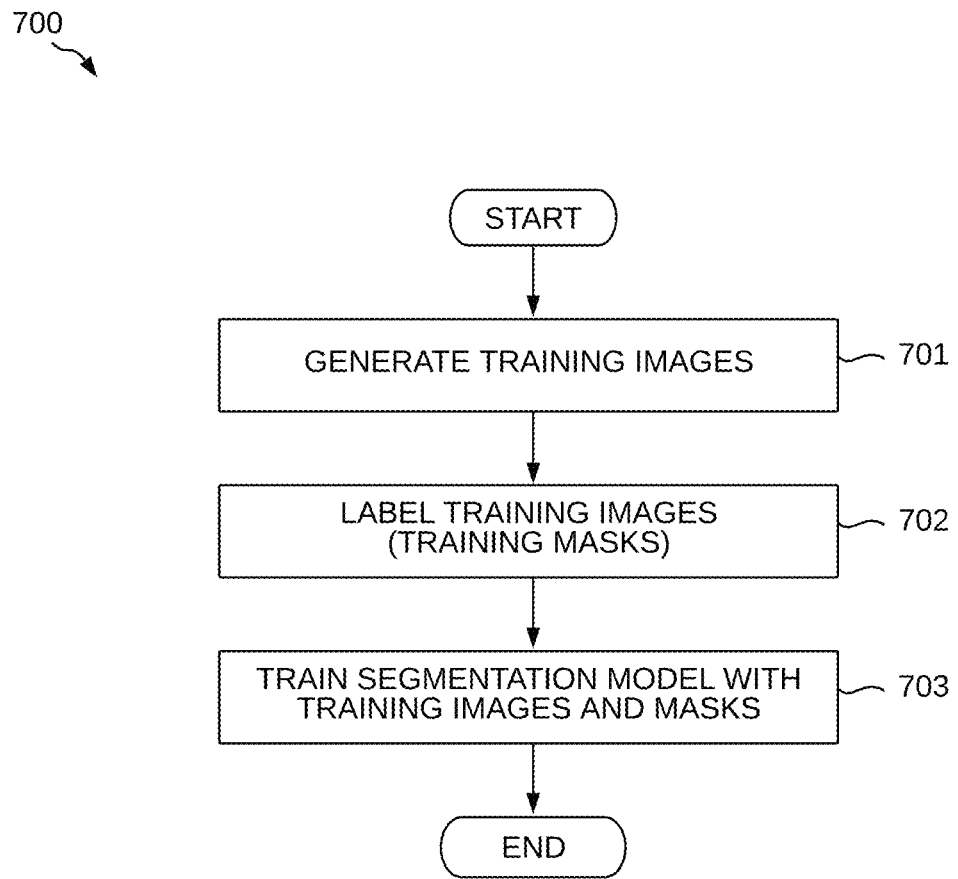
FIG. 22 is a flowchart of a method 700 for training a segmentation model using training images in accordance with one embodiment.

In one embodiment, the segmentation model is a supervised segmentation model trained prior to execution of method 500 as explained in connection with FIG. 22. In the example of FIG. 22, a segmentation model is trained using training data, such as training data 77 shown in FIG. 9. The segmentation model is trained using a base set of images along with labeled masked versions of the images. Dice score metrics are used to improve accuracy of the segmentation model. Image augmentation techniques are optionally employed to increase training data supplied to the segmentation model. In one example, the segmentation model involves a U-Net type convolutional neural network that employs a BCEWithLogitsLoss type of loss function. In another embodiment, the segmentation model is an unsupervised segmentation model. It is appreciated that other implementations involve different types of computer vision and image processing techniques, including non-machine learning-based methodologies.

In a fourth step (Step 504), a contour is detected on a target structure in the binary image. The contour is any shape for a dimension that is needed in performing analysis of the structure, such as weight estimation of the structure. The shape is taken from the group consisting of a triangle, a circle, an oval, a semi-circle, a square, a rectangle, parallelogram, rhombus, trapezium, kite, a polygon such as pentagon, hexagon, octagon, nonagon, decagon, a convex shape, a non-convex shape, or other shaped contours. For example, in the case of a round, brilliant-mounted gemstone, the contour detected is a circle. The flowcharts in FIGS. 26 and 27 describe one technique of detecting a contour using image data using random sample consensus (RANSAC) techniques.

Figure 24:
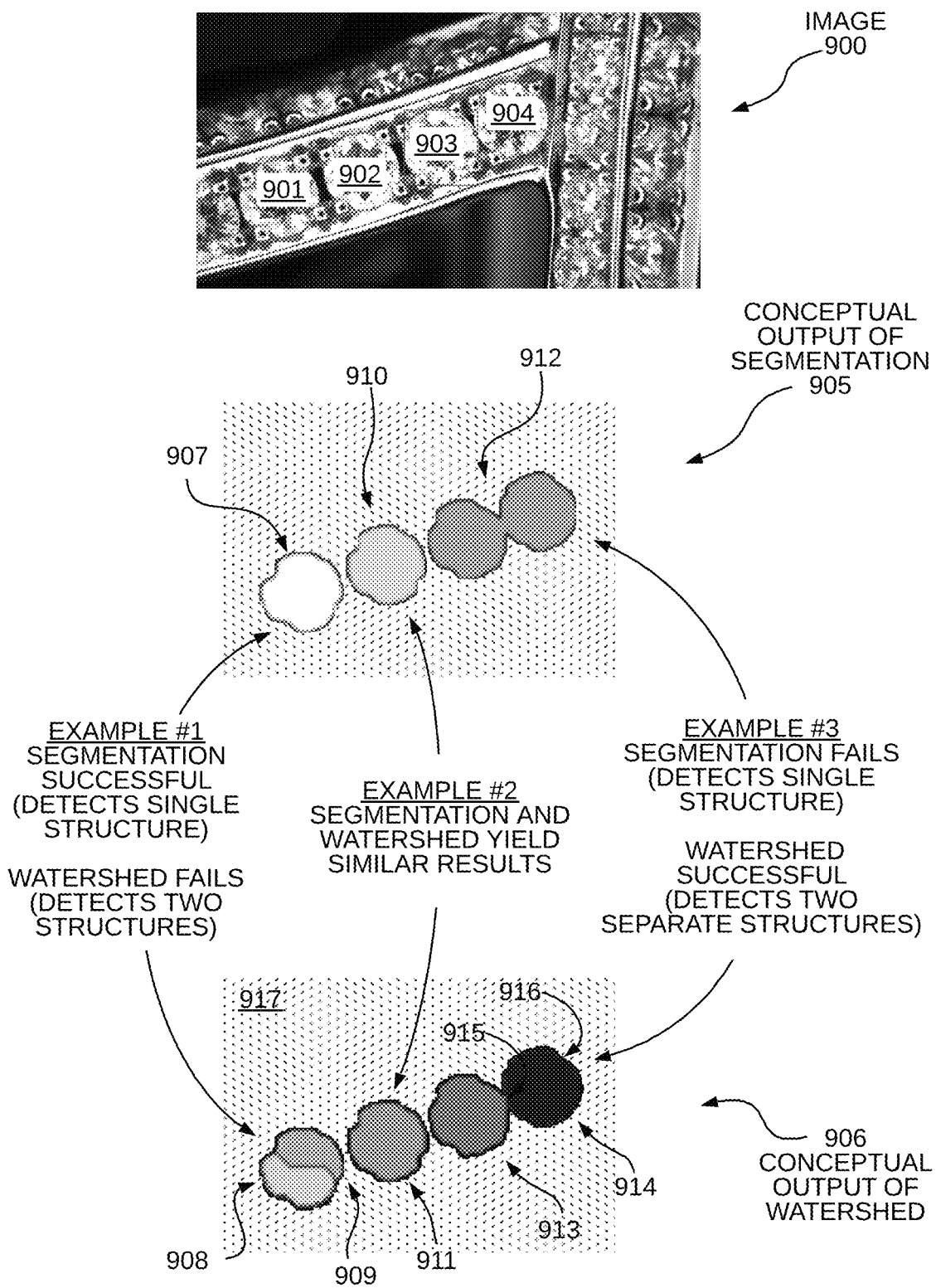
FIG. 24 is a conceptual diagram that shows how segmentation and watershed segmentation operate together in predicting a contour or feature in an image 900.

In a fifth step (Step 505), a determination is made as to whether watershed segmentation was successful. One technique for ascertaining success of watershed segmentation is detecting whether contours generated by watershed segmentation overlap. If the degree of overlap between predicted contours is too great, then watershed segmentation should not be used. For example, predicted contours 908 and 909 shown in FIG. 24 overlap too much and watershed segmentation should not be used. If, on the other hand, the degree of overlap between predicted contours is absent or not significant, then watershed segmentation should be used. For example, predicted contours 913 and 914 overlap and require watershed segmentation for accurate contour detection. If it is determined that the watershed segmentation was successful, contour on targets is detected with watershed segmentation in a sixth step (Step 506) and the method proceeds to display the contour on the image (Step 508). If, on the other hand, it is determined that the watershed segmentation was unsuccessful, contour on targets is detected without watershed segmentation in a seventh step (Step 507) and the method proceeds to display the contour on the image (Step 508). In the example of FIG. 24 involving analysis of gemstone structures, various results are shown where segmentation is successful and unsuccessful. In a first example output #1, watershed segmentation is not successful. In a second example output #2, watershed segmentation is successful but yields similar results to using the segmentation model without watershed segmentation. In a third example output #3, watershed segmentation is successful and yields significantly better results than using the segmentation model.

In an eighth step (Step 508), the contour is displayed on the image. In one embodiment, the contour detected is displayed overlaid above raw or processed images obtained using the image assembly.

In a ninth step (Step 509), a determination is made as to whether the result is acceptable. If it is determined that the result is not acceptable, manual intervention is performed at Step 510 to obtain a more precise contour via user input. If, on the other hand, it is determined that the result is acceptable, then the contour is used to estimate a dimension of the contour in Step 511. The resulting contour detected by the system is acceptable if the contour predicted by the system and overlaid on the raw or processed image adequately fits around the contour of interest. In the case of a round gemstone, if the contour predicted by the weight estimation controller 51 is displaced or does not appropriately encircle a circumference of the round gemstone, then the operator is able to reject the estimated contour. For example, the contour predicted in FIG. 16 (feature 401) is too small and does not adequately encompass an outer circumference of the gemstone. As such, an operator is able to utilize the manual point selection interface 400 to correctly identify the correct contour.

In a tenth step (Step 510), manual intervention is performed. During manual intervention, a user interface is provided for an operator to supply input that adequately identifies a contour of interest that is needed for the system to obtain a precise estimation. In the example of FIG. 5, user input is received from the operator onto the control panel 53 of the optical weight estimation system 50. The system in this example is predicting an outer diameter of the gemstone. Accordingly, the contour of interest is a circle and the interface 400 receives three points of input. The three inputs supplied by the operator are sufficient to identify the circle that defines an outer diameter of the gemstone. FIGS. 16-19 show operation of the manual point-selection user interface 400. The operator supplies the first point 404 (shown in FIG. 16) via interface 400, the second point 405 (shown in FIG. 17) via interface 400, and the third point 406 (shown in FIG. 18) via interface 400. FIG. 19 shows the contour (updated feature 407) generated as a result of manual intervention in Step 510.

In an eleventh step (Step 511), the dimension of the contour is determined. In one embodiment, the pixel counting is performed by the weight estimation controller to identify the desired dimension of the contour. The dimension is optionally output and presented on the display panel.

In a twelfth step (Step 512), the dimension is used in performing the weight estimation. For example, carat weight is output on the display panel as shown in FIG. 12.

FIG. 21 is a diagram showing a segmentation model 630 that converts raw or pre-processed images to two-dimensional binary images. For example, this conversion is performed at Step 503 of method 500 shown in FIG. 20. The segmentation model 630 is another embodiment of image segmentation block 80 shown in FIG. 8. Reference numeral 610 shows pre-processed image 610. The image 610 shows a gemstone 620 at a center of the image 610. The binary image 640 includes pixels having one of two pixel values. A first of the two pixel values represents a structure being analyzed, in this case gemstone 620. A second of the two pixel values represents the background surrounding the structure being analyzed. For example, the first of the two pixel values represents a white color (255,255,255) and the second of the two pixel values represents a black color (0,0,0). In this example, white pixels represent the gemstone 620 and black pixels represent everything else, including the background and prongs that mount the gemstone to the jewelry.

FIG. 22 is a flowchart of a method 700 for training a segmentation model using training images in accordance with one embodiment. In a first step (Step 701), training images are generated. For example, the segmentation model 630 shown in FIG. 21 is trained using training data, such as training data 77 shown in FIG. 9. Image augmentation techniques are optionally employed to increase training data supplied to the segmentation model. For example, training images are rotated to programmatically obtain additional images from a base set of images.

In a second step (Step 702), training images are labeled. Labels such as masks are generated for each training image. For example, for each training image, a binary image is generated identifying a target (such as a gemstone) with white pixels and background (such as jewelry, prongs, and mounts) with black pixels. These binary mask images represent desired output from the segmentation model and are used to train the model.

In a third step (Step 703), the segmentation model is trained using training images and training masks. Dice score metrics are used to improve accuracy of the segmentation model. The segmentation model involves a U-Net-type convolutional neural network that employs a BCEWithLogitsLoss type of loss function. In another embodiment, the segmentation model is an unsupervised segmentation model. It is appreciated that other implementations involve different types of computer vision and image processing techniques, including non-machine learning-based methodologies.

Figure 23:
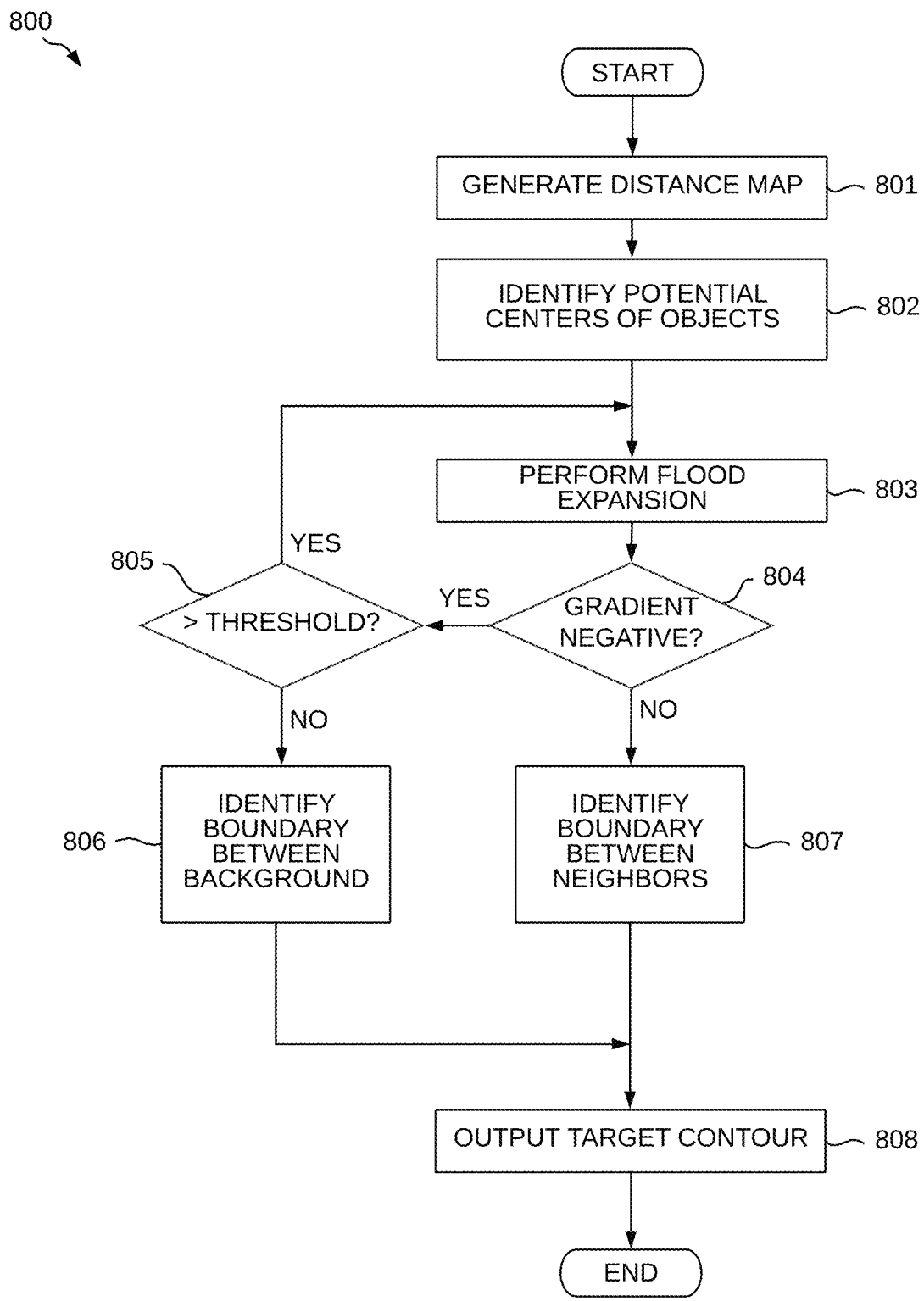
FIG. 23 is a flowchart of a method 800 that describes an example of watershed segmentation in accordance with one embodiment.

FIG. 23 is a flowchart of a method 800 that describes an example of watershed segmentation in accordance with one embodiment. For example, method 800 is performed at Step 504 in method 500 of FIG. 20. In a first step (Step 801), a distance map is generated. In a second step (Step 802), the potential centers of objects are identified. In a third step (Step 803), flood expansion is performed. In a fourth step (Step 804), a determination is made as to whether the gradient is negative. If it is determined that the gradient is not negative, the boundary between neighbors is identified (Step 807). For example, reference numeral 915 in FIG. 24 identifies a boundary between structures 913 and 914. If it is determined that the gradient is negative, a determination is made as to whether the gradient is above threshold (Step 805). If it is determined that the gradient is above threshold, the method proceeds to Step 803. If it is determined that the gradient is not above threshold, the boundary between the background is identified (Step 806). For example, reference numeral 916 in FIG. 24 identifies a boundary between structure 914 and background 917. Both Step 806 and Step 807 proceed to an eighth step (Step 808), where the target contour is obtained.

FIG. 24 is a conceptual diagram that shows how segmentation and watershed segmentation operate together in predicting a contour or feature in an image 900. Watershed segmentation is particularly effective in analyzing items with multiple target structures of interest. Watershed segmentation is useful for distinguishing, identifying, and separating multiple target structures in a reliable and robust fashion. In operation, a raw or pre-processed image 900 is obtained using an imaging assembly such as imaging assembly 54 shown in FIG. 10, imaging assembly 200 shown in FIG. 14, imaging assembly 1404 shown in FIG. 29, or imaging assembly 1525 shown in FIG. 30. The raw or pre-processed image 900 includes four gemstones 901, 902, 903, and 904. Reference numeral 905 identifies a conceptual output of segmentation, such as segmentation model 630 shown in FIG. 21. Reference numeral 906 identifies a conceptual output of watershed segmentation, as described in connection with FIGS. 21, 22, and 28. These figures are described as "conceptual" because the output of segmentation and watershed segmentation do not yield multi-colored outputs. Rather, the color and shading shown in FIG. 24 is presented for explanatory purposes to further understanding of how both techniques operate in tandem to improve contour prediction and weight estimation.

Three example outputs of operation are shown in FIG. 24. In a first example #1 involving gemstone 901, segmentation is successful and watershed segmentation fails. As shown in FIG. 24, segmentation is successful in detecting a contour 907 that approximates an outer diameter of gemstone 901. On the other hand, the output of watershed segmentation interprets gemstone 901 as two separate structures and predicts two separate contours 908 and 909 that overlap. In the first example #1, application of watershed segmentation would yield an inaccurate contour and segmentation without watershed analysis would yield a more accurate contour. Accordingly, in method 500 of FIG. 20, at step 505, watershed segmentation would be determined to be unsuccessful and method 500 would proceed to step 507 using the contour on the target output by segmentation without watershed analysis.

In a second example #2 involving gemstone 902, both segmentation and watershed segmentation are successful and yield similar predicted contours. As shown in FIG. 24, segmentation is successful in detecting a contour 910 that approximates an outer diameter of gemstone 902. Watershed segmentation is also successful in detecting a contour 911 that approximates the outer diameter of gemstone 902. In the second example #2, application of segmentation and watershed segmentation both yield an accurate contour prediction. Accordingly, in method 500 of FIG. 20, at step 505, watershed segmentation would be determined to be successful and method 500 would proceed to step 506 using the contour on the target output by watershed segmentation.

In a third example #3 involving two gemstones 903 and 904, segmentation fails and watershed segmentation is successful. As shown in FIG. 24, segmentation is unsuccessful in detecting two separate contours for gemstones 903 and 904. Instead, segmentation detects a single hourglass-shaped contour 912. Segmentation without watershed segmentation interprets gemstones 903 and 904 as a single structure. On the other hand, the output of watershed segmentation interprets gemstones 903 and 904 as two separate structures and predicts two separate contours 913 and 914. In the third example #3, application of watershed segmentation would yield accurate contours and segmentation without watershed analysis would yield an inaccurate single contour. Accordingly, in method 500 of FIG. 20, at step 505, watershed segmentation would be determined to be successful and method 500 would proceed to step 506 using the contour on the target output by watershed analysis.

Figure 25:
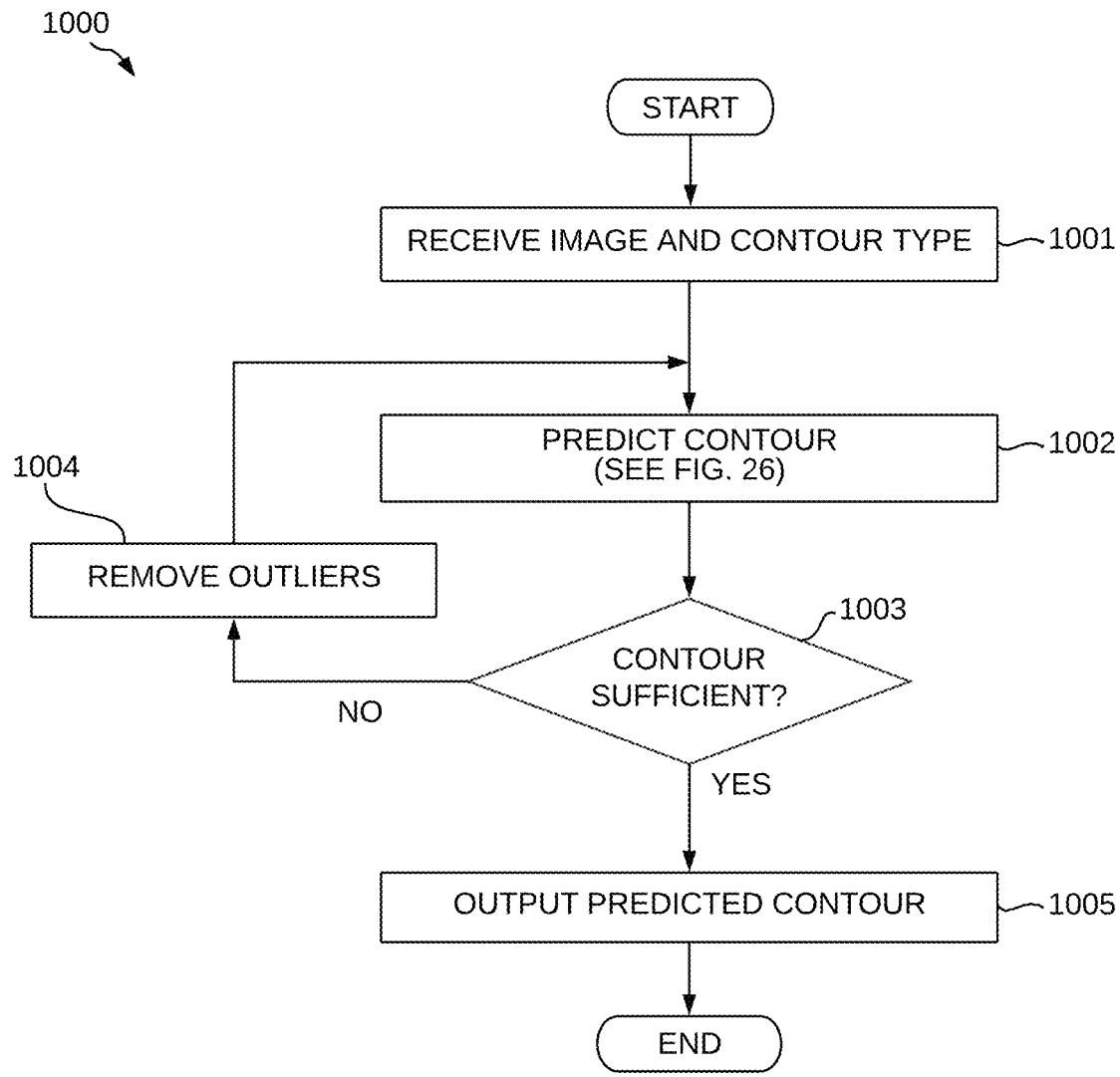
FIG. 25 is a flowchart of a method 1000 that describes an exemplary approach of contour detection.

FIG. 25 is a flowchart of a method 1000 that describes an exemplary approach of contour detection (e.g. Step 505 in FIG. 20). In a first step (Step 1001), the image and contour type are received.

In a second step (Step 1002), the contour is predicted. As shown in method 1100 of FIG. 26, the contour is predicted using a random sample consensus technique to estimate a contour.

In a third step (Step 1003), a determination is made as to whether the contour is sufficient. For example, a predicted contour is compared to random points generated during the contour prediction step (Step 1002). The predicted contour is sufficient if the predicted contour overlaps with the random points. The random points should lie on the predicted contour, otherwise random points that do not lie on the predicted contour are outliers and should be removed. If it is determined that the contour is sufficient, the method proceeds to Step 1005. If it is determined that the contour is insufficient, the method proceeds to Step 1004.

In a fourth step (Step 1004), outliers are removed and the method proceeds back to Step 1002.

In a fifth step (Step 1005), the predicted contour is output.

Figure 26:
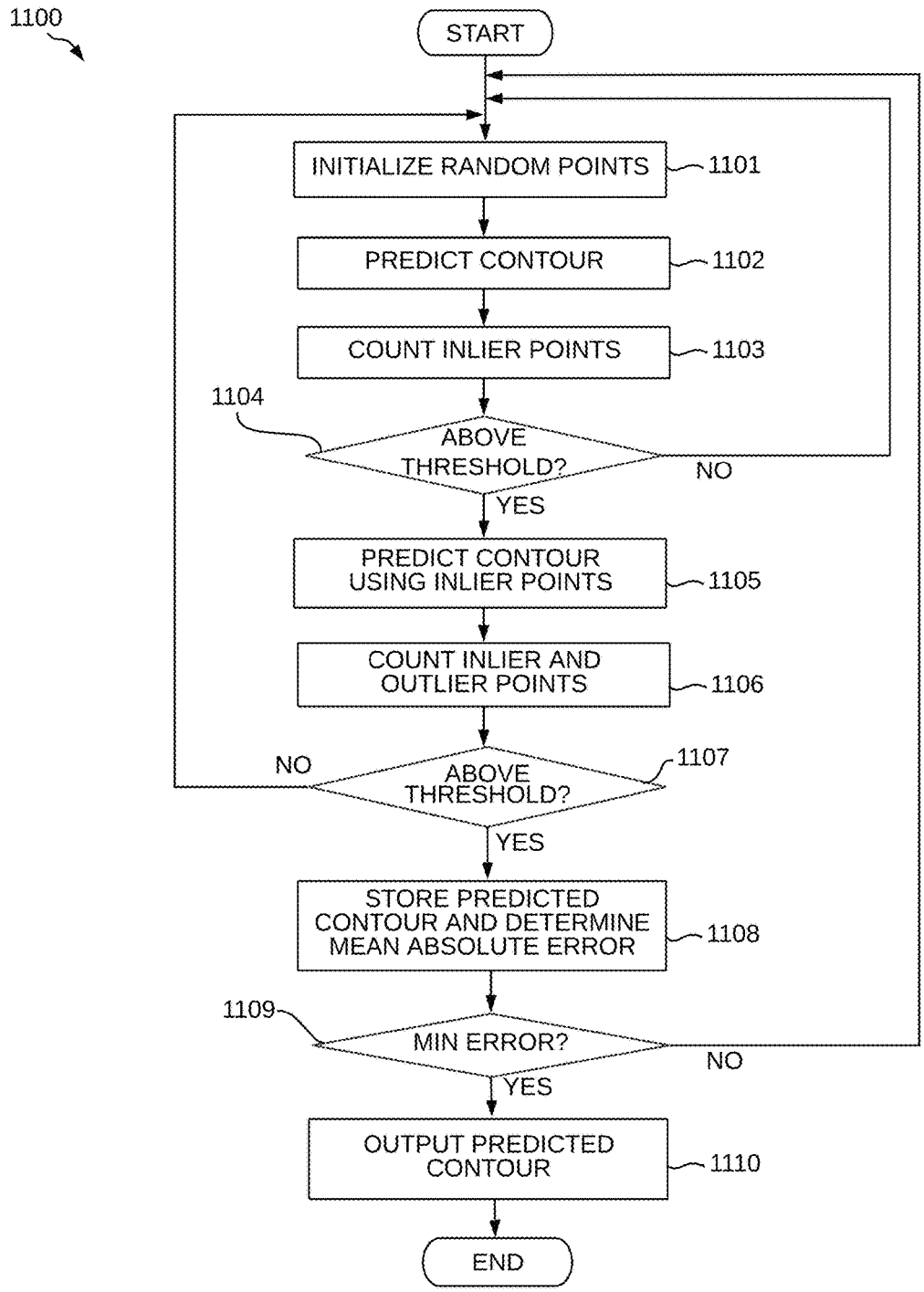
FIG. 26 is a flowchart of a method 1100 that describes an exemplary approach of using random sample consensus (RANSAC) techniques to predict a contour.

FIG. 26 is a flowchart of a method 1100 that describes an exemplary approach of using random sample consensus (RANSAC) techniques to predict a contour (e.g. Step 1002 in FIG. 25). In a first step (Step 1101), random points are initialized. The number of random points depends on the contour type that is being predicted. For example, if the contour is a circle, as in the case of analyzing a round brilliant gemstone, three random points will be initialized.

In a second step (Step 1102), a contour is predicted.

In a third step (Step 1103), inlier points are counted.

In a fourth step (Step 1104), a determination is made as to whether the inlier points are above threshold. If it is determined that the inlier points are above threshold, the method proceeds to Step 1105. If it is determined that the inlier points are not above threshold, the method proceeds back to the beginning of the novel process.

In a fifth step (Step 1105), inlier points are used to predict the contour.

In a sixth step (Step 1106), inlier and outlier points are counted.

In a seventh step (Step 1107), a determination is made as to whether the inlier and outlier points are above threshold. If it is determined that the inlier and outlier points are above threshold, the method proceeds to Step 1108. If it is determined that the inlier and outlier points are not above threshold, the method proceeds back to the beginning of the novel process.

In an eighth step (Step 1108), the predicted contour is stored and the mean absolute error is determined.

In a ninth step (Step 1109), a determination is made as to whether or not the error is minimal. If it is determined that the error is minimal, the method proceeds to Step 1110. If it is determined that the error is not minimal, the method proceeds back to the beginning of the novel process.

In a tenth step (Step 1110), the predicted contour is output and the method ends.

Figure 27:
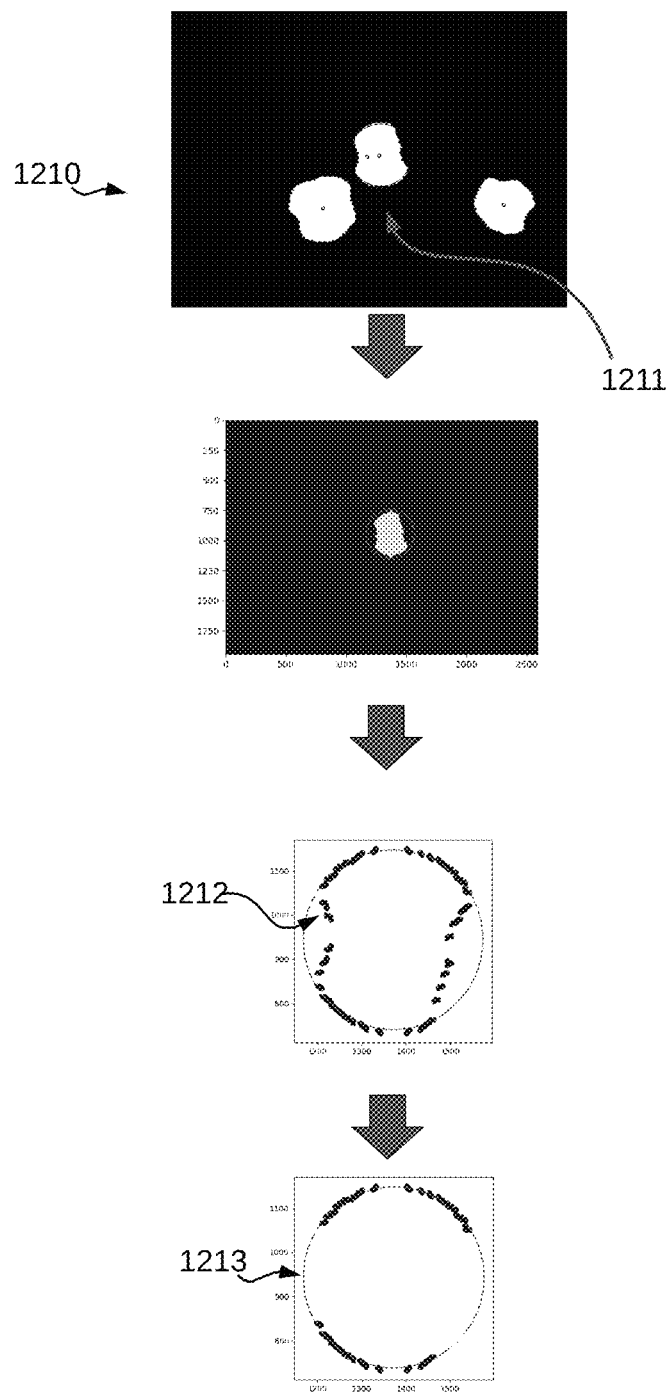
FIG. 27 is a diagram showing various image processing stages during application of the RANSAC techniques described in the method 1100 shown in FIG. 26.

FIG. 27 is a diagram showing various image processing stages during application of the RANSAC techniques described in the method 1100 shown in FIG. 26. Reference numeral 1210 shows a binary image of multiple gemstones in mounted settings. As shown, gemstone 1211 does not appear circular in image 1210. During application of the RANSAC techniques, outlier points are iteratively removed.

Reference numeral 1212 identifies a group of such outliers. A circle 1213 is estimated based on points that are not iteratively removed during application of the RANSAC technique. In other embodiments, contours and shapes other than circles are also detected and predicted based on obtained images. Circle is but one type of shape that can be predicted and identified in captured images.

In another embodiment, an algorithm is employed to estimate weight for bezel-set stones. The unobscured edges are identified by the algorithm and then a predetermined extrapolation to the concealed edges is added in order to generate the overall dimensions. For example, a visible edge is identified. The visible edge is the intersection of the stone and the metal setting. Using empirical methods, one or more correlations are identified for the amount of concealed stone versus possible dependent variables such as stone size, cut type, or metal setting type. Based on such correlations, one or more correction factors are applied to geometrically extrapolate the visible edge to the estimated true edge. In operation, an operator selects on a control panel that the gemstone to be imaged is a bezel-set stone. Based on this input, the device applies the algorithm to analyze the bezel-set stone. After the operator captures the image, both the visible edge and estimated true edge are shown to the operator on the display panel. The operator elects to accept the image or manually selects the estimated true edge.

Figure 28:
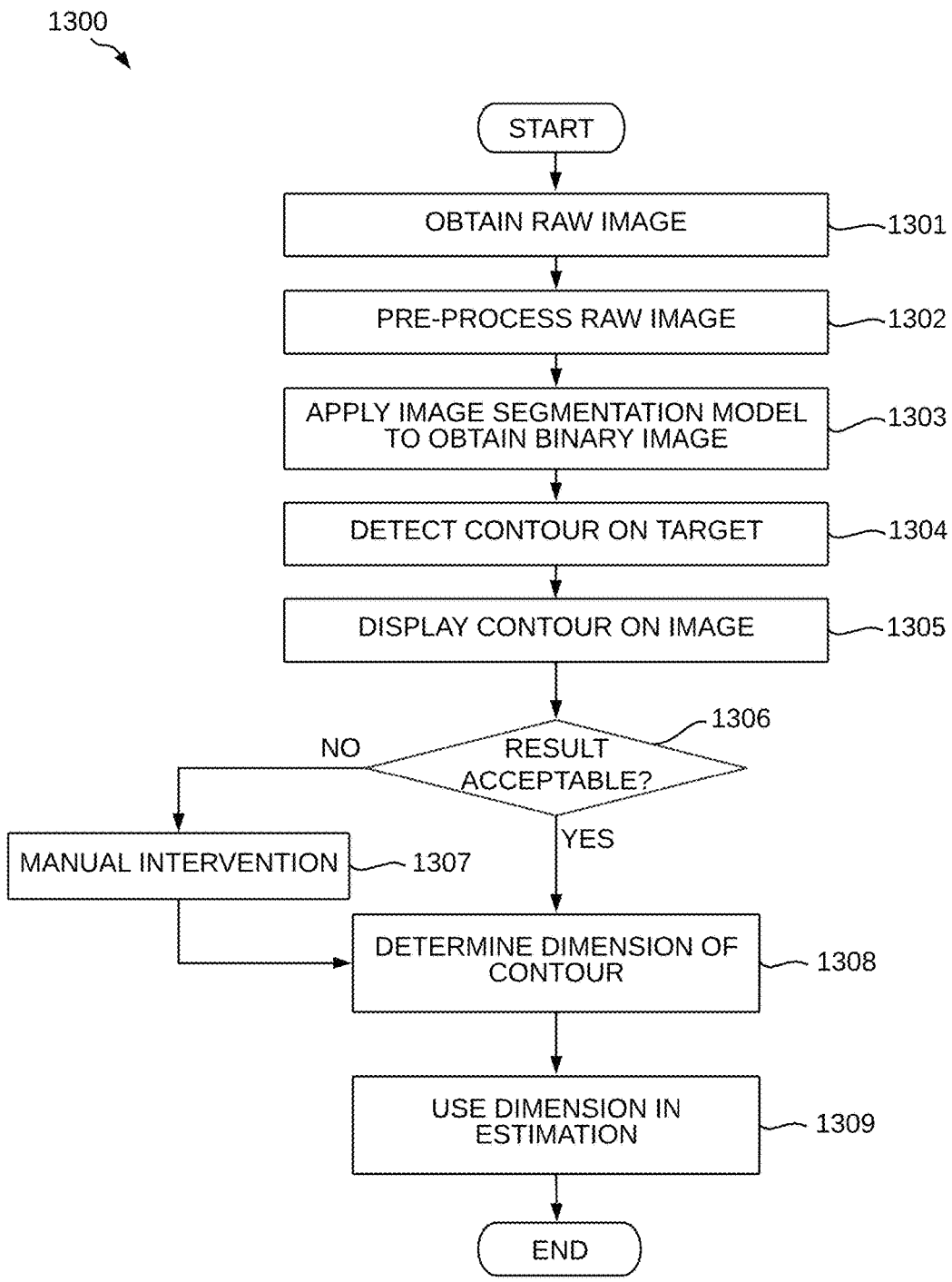
FIG. 28 is a flowchart of a method 1300 for estimating characteristics of a structure, such as weight, density or volume, based on one or more images of the structure.

FIG. 28 is a flowchart of a method 1300 for estimating characteristics of a structure, such as weight, density, or volume, based on one or more images of the structure. The method 1300 is performed by any suitable processing hardware operable to receive and process images. In one embodiment, the method 1300 is performed by an optical estimation controller, such as an optical estimation controller 1401 shown in FIG. 29. In a first step (Step 1301), an image of a structure is obtained. The image assembly 54 shown in FIG. 10, imaging assembly 200 shown in FIG. 14, imaging assembly 1404 shown in FIG. 29, imaging assembly 1525 shown in FIG. 30, or another imaging device operable to capture images of a surface of a structure is used to obtain one or more images. Such images are also referred to as "raw" or "unprocessed" images. In the case of gemstone analysis, an image of a top surface of one or more mounted gemstones is obtained.

In a second step (Step 1302), the obtained image is pre-processed. Pre-processing involves resizing, centering, recropping, and performing other preprocessing steps to ensure the image is sufficient for further analysis. During pre-processing, the structure captured in the image is centered within the image. If the image is determined not to contain a structure, then the image is discarded. Pre-processing ensures that the image is usable to perform further optical estimation analysis. In the example of FIG. 21, pre-processed image 610 is generated from a raw image (not shown). The raw image shows a gemstone 620 at a center of the pre-processed image 610.

In applications where the structure being imaged is a gemstone, if no gemstone is detected in the image, then the image is discarded. For example, an operator of the optical characteristic estimation system 1400 uses image assembly 1404 of FIG. 29 or imaging assembly 200 of FIG. 14 to obtain an image of a mounted gemstone. In the example shown in FIG. 29, the optical estimation controller 1401 pre-processes the image depending on the characteristic being estimated. If the optical estimation controller 1401 determines that no gemstone is detected in the image, then the image control panel 1403 notifies the user that the image is not usable and to retake an image of the desired gemstone.

In a third step (Step 1303), binary images are obtained using a segmentation model. The binary image includes pixels having one of two pixel values. A first of the two pixel values represents a structure being analyzed. A second of the two pixel values represents the background or surroundings of the structure being analyzed. The background is effectively noise. For example, the first of the two pixel values represents a white color (255,255,255) and the second of the two pixel values represents a black color (0,0,0). In cases where the optical characteristic estimation system is used to analyze mounted gemstones, white pixels represent a gemstone and black pixels represent everything else, including background, prongs, holders, and other aspects that introduce noise and should be disregarded. In the example of FIG. 21, a binary image 640 is generated from preprocessed image 610.

In one embodiment, the segmentation model is a supervised segmentation model trained prior to execution of method 1300 as explained in connection with FIG. 22. In the example of FIG. 22, a segmentation model is trained using training data, such as training data 77 shown in FIG. 9. The segmentation model is trained using a base set of images along with labeled masked versions of the images. Dice score metrics are used to improve accuracy of the segmentation model. Image augmentation techniques are optionally employed to increase training data supplied to the segmentation model. In one example, the segmentation model involves a U-Net-type convolutional neural network that employs a BCEWithLogitsLoss type of loss function. In another embodiment, the segmentation model is an unsupervised segmentation model. It is appreciated that other implementations involve different types of computer vision and image processing techniques, including non-machine learning-based methodologies.

In a fourth step (Step 1304), a contour is detected on a target structure in the binary image. The contour is any shape for a dimension that is needed in performing analysis of the structure, such as weight estimation of the structure. The shape is taken from the group consisting of a triangle, a circle, an oval, a semi-circle, a square, a rectangle, parallelogram, rhombus, trapezium, kite, a polygon such as pentagon, hexagon, octagon, nonagon, decagon, a convex shape, a non-convex shape, or other shaped contours. For example, in the case of a round, brilliant-mounted gemstone, the contour detected is a circle. The flowcharts in FIGS. 26 and 27 describe one technique of detecting a contour using image data using random sample consensus (RANSAC) techniques.

In a fifth step (Step 1305), the contour is displayed on the image. In one embodiment, the contour detected is displayed overlaid above raw or processed images obtained using the image assembly.

In a sixth step (Step 1306), a determination is made as to whether the result is acceptable. If it is determined that the result is not acceptable, manual intervention is performed at Step 1307 to obtain a more precise contour via user input. If, on the other hand, it is determined that the result is acceptable, then the contour is used to estimate a dimension of the contour (Step 1308). The resulting contour detected by the system is acceptable if the contour predicted by the system and overlaid on the raw or processed image adequately fits around the contour of interest. In the case of a round gemstone, if the contour predicted by the optical estimation controller 1401 is displaced or does not appropriately encircle a circumference of the round gemstone, then the operator is able to reject the estimated contour. For example, the contour predicted in FIG. 16 (feature 401) is too small and does not adequately encompass an outer circumference of the gemstone. As such, an operator is able to utilize the manual point selection interface 400 to correctly identify the correct contour.

In a seventh step (Step 1307), manual intervention is performed. During manual intervention, a user interface is provided for an operator to supply input that adequately identifies a contour of interest that is needed for the system to obtain a precise estimation. In the example of FIG. 29, user input is received from the operator onto a control panel 1403 of the optical characteristic estimation system 1400. The system in this example is predicting an outer diameter of the gemstone. Accordingly, the contour of interest is a circle and the interface 400 receives three points of input. The three inputs supplied by the operator are sufficient to identify the circle that defines an outer diameter of the gemstone. FIGS. 16-19 show operation of the manual point selection user interface 400. The operator supplies the first point 404 (shown in FIG. 16) via interface 400, the second point 405 (shown in FIG. 17) via interface 400, and the third point 406 (shown in FIG. 18) via interface 400. FIG. 19 shows the contour (updated feature 407) generated as a result of manual intervention in Step 1307.

In an eighth step (Step 1308), the dimension of the contour is determined. In one embodiment, the pixel counting is performed by the weight estimation controller to identify the desired dimension of the contour. The dimension is optionally output and presented on the display panel.

In a ninth step (Step 1309), the dimension is used in performing the weight estimation. For example, carat weight is output on the display panel as shown in FIG. 12.

FIG. 29 is a diagram showing an embodiment of an optical characteristic estimation system 1400. The optical characteristic estimation system 1400 has a similar structure and function as the optical weight estimation system 50 shown in FIG. 5. For example, the optical characteristic estimation system 1400 detects one or more characteristics of a structure based on an image, including weight, density, volume, or any other desired characteristic pertaining to the structure under analysis. Additionally, the optical characteristic estimation system 1400 is operable with watershed segmentation method 500 or without watershed segmentation method 1300.

The optical characteristic estimation system 1400 comprises an optical feature estimation controller 1401, a display panel 1402, a control panel 1403, an imaging assembly 1404, a user input interface 1405, and a network interface 1406. The network interface 1406 communicates collected data 1407 to an external server system 1408 over a network 1409. The server system 1408 collects data 1407 obtained by one or more optical weight estimation systems operating in the field, such as system 1400, including images and corresponding weight estimations. The server system 1408 uses the collected data 1407 to improve analysis functionality. The server system 1408 sends software updates 1410 to the one or more optical weight estimation systems operating in the field, such as system 1400, over the network 1409. For example, the server system 1408 generates updated weights usable by convolutional neural networks of one or more optical characteristic estimation systems (or optical weight estimation systems), such as CNN 79 shown in FIGS. 8-9, based on the collected data 1407. Next, the server system communicates the updated weights to the one or more optical weight estimation systems over the network in the form of software updates 1410. The updated weights improve feature identification capabilities of each of the optical weight estimation systems operating in the field, which in turn results in improved likelihood of feature identification success.

Figure 30:
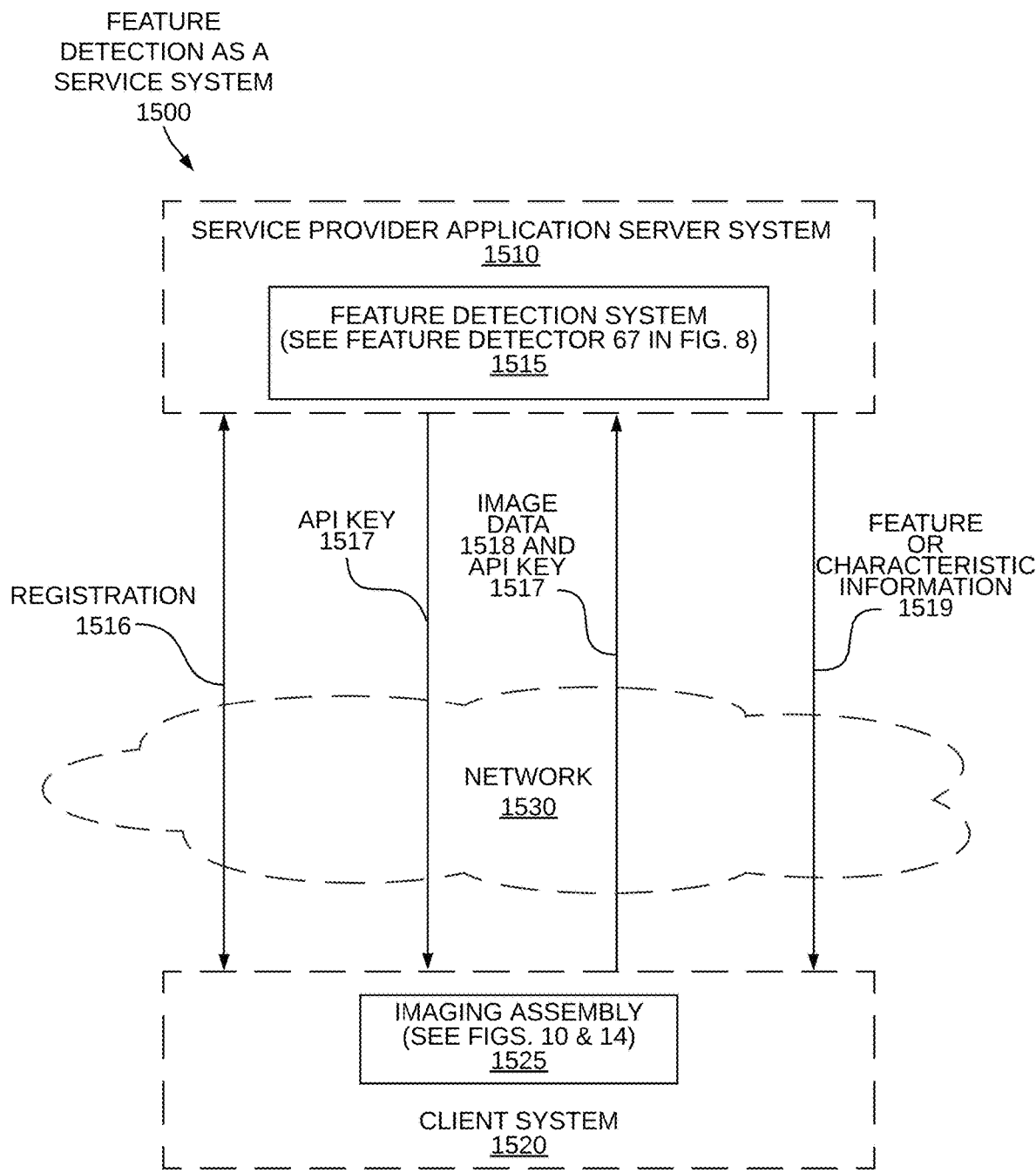
FIG. 30 is a diagram showing a feature detection as a service (FDaaS) system.
Figure 7:
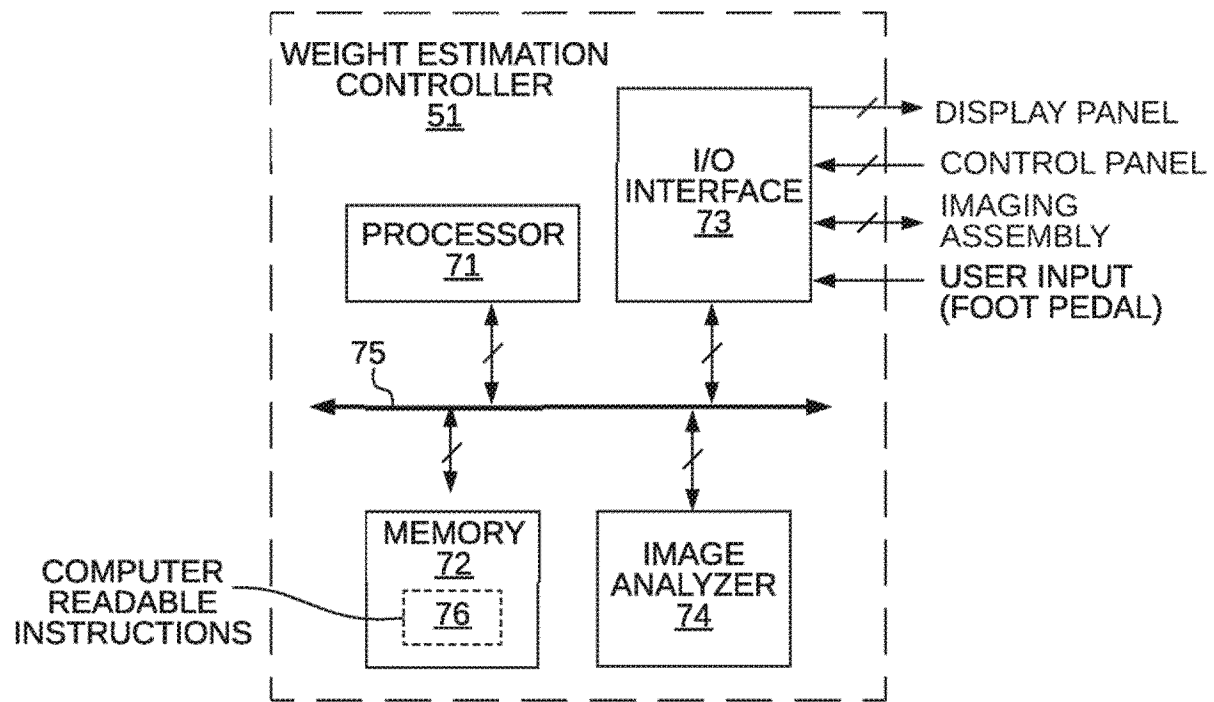
Figure 8:
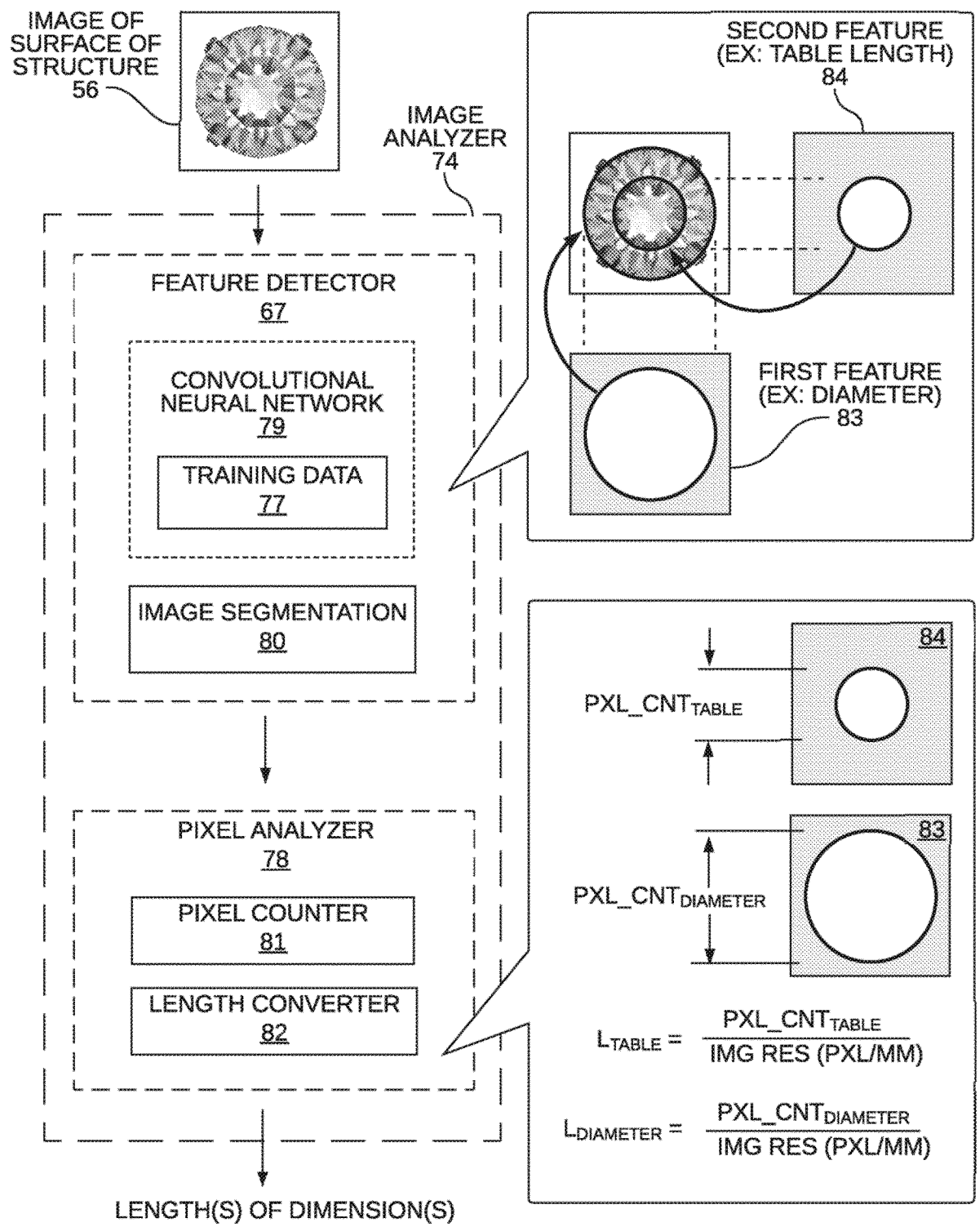

FIG. 30 is a diagram showing a feature detection as a service (FDaaS) system 1500. The feature detection as a service system 1500 is operated by a service provider entity. The feature detection as a service system 1500 includes a service provider application server system 1510 that provides feature detection services to one or more clients. For example, the feature detection as a service system 1500 is used by a client to identify features or estimate characteristics of a structure via their client system 1520. In this example, the feature detection as a service system 1500 communicates with client system 1520 over a network 1530. The service provider optionally provides the client with an imaging assembly 1525 for use at their facility, such as image assembly 54 shown in FIG. 10 or the imaging assembly 200 shown in FIG. 14. In other embodiments, the client uses their own imaging or camera instrumentation to obtain images of structures to analyze.

The service provider application server system 1510 includes a feature detection system 1515. The feature detection system 1515 is trained to identify features or estimate characteristics of a structure based on image data. The feature detection system 1515 is trained in accordance with various disclosed embodiments, such as those shown in FIGS. 8-9 and 20-21. As the service provider obtains more data and improves machine learning models internally, clients receive more and more accurate feature identification and characteristic estimation.

In operation, the client system 1520 is registered with the feature detection system 1515 via a registration process 1516. The registration process 1516 typically involves the client system 1520 forwarding contact information, billing and payment information, and business information of the client. Next, a key or token exchange process is performed where the client system 1520 receives one or more API keys 1517 for secure communication with the service provider application server system 1510. For each image the client desires feature or characteristic information, the client system 1520 sends image data 1518 along with the API key 1517 to the service provider application server system 1510. After validating the API key 1517, the service provider application server system 1510 uses the received image data 1518 to generate feature or characteristic information 1519 for the structure of interest to the client. The service provider application server system 1510 sends the generated feature or characteristic information 1519 to the client system 1520 for use by the client in their desired internal processes.

System 1500 provides significant technical advantages to feature identification and characteristic estimation. Clients are able to employ lighter weight instrumentation at their facilities and offload computationally heavy machine-learning processing to the service provider application server system 1510. The service provider application server system 1510 is operable to leverage distributed processing operating in parallel, such as through graphics processing units (GPUs) or other favorable computing architectures, to provide robust and efficient analysis of structures under analysis. Machine learning models within feature detection system 1515 improve as the service provider collects more data, which in turn provides clients with more accurate feature identification and characteristic estimation.

Accordingly, various modifications, adaptations, and combinations of various features of the described embodiments can be practiced without departing from the scope of the invention as set forth in the claims. For example, some embodiments described above relate to diamonds; however, diamonds are but one type of structure that the novel systems and techniques may be used to analyze. The present techniques are also applicable to other faceted structures, including other types of colored and colorless gemstones, mineral crystals, faceted amorphous structures, and non-faceted structures such as cabochons.

The present system and techniques are also widely applicable to other areas outside of gemology in which structural analysis is desirable. For example, optical weight estimation system 50 or optical characteristic estimation system 1400 is adaptable to estimate a dimension of any structure based on an image of the structure and perform subsequent calculation using the estimated dimension. In some embodiments, no user input is required to generate the dimension estimate or the calculation. The optical weight estimation system 50 or optical characteristic estimation system 1400 is adaptable to various disciplines beyond gemology where an image of an item is obtained and one or more contours are detectable via novel techniques disclosed herein. Although certain specific embodiments are described above for instructional purposes, the teachings of this patent document have general applicability and are not limited to the specific embodiments described above.

What is claimed is:

1. A method comprising:
   receiving structure characteristic information of a gemstone;
   supplying light directly onto a table facet of a gemstone via a coaxial light assembly;
   supplying uniform light to the gemstone via a diffuse dome assembly without directly illuminating the gemstone;
   generating an image of a surface of the gemstone; and
   estimating weight of the gemstone based on the image of the surface of the gemstone and on the structure characteristic information, wherein estimating weight of the gemstone based on the image occurs in response to detecting a foot pedal input, wherein no other user input is involved in estimating weight of the gemstone other than the structure characteristic information and the foot pedal input, and wherein estimating weight of the gemstone involves determining whether to apply watershed segmentation to identify a boundary of the gemstone in the image.

2. The method of claim 1, wherein the gemstone is mounted in a setting, wherein the receiving, generating, and estimating are performed while the gemstone remains mounted in the setting, and wherein the receiving, generating, and estimating are performed without having to unmount the gemstone from the setting.

3. The method of claim 1, further comprising:
   presenting output from an imaging assembly on a display panel, wherein the gemstone is disposed below the imaging assembly.

4. The method of claim 3, wherein the gemstone is mounted in a setting of a jewelry item, wherein a user holds the jewelry item under the imaging assembly without mounting the jewelry item to a jewelry item holder, and wherein the user uses the display panel to generate the image used in estimating weight of the gemstone.

5. The method of claim 1, further comprising:
   receiving structure identification information; and
   storing estimated weight of the gemstone in connection with the structure identification information.

6. The method of claim 1, further comprising:
   generating feedback overlaid above the image, wherein the feedback indicates features detected in the image.

7. The method of claim 1, wherein estimating weight of the gemstone involves using the image of the surface of the gemstone to determine at least one dimension of the gemstone, the method further comprising:
   communicating weight estimation and image information to an external server, wherein the external server uses weight estimation and image information to retrain a machine learning model.

8. The method of claim 1, wherein the gemstone has at least one of a table length or a diameter, wherein the table length or the diameter are determined from the image, and wherein the structure characteristic information and at least one of the table length or the diameter are used to determine the weight of the gemstone.

9. The method of claim 1, wherein the structure characteristic information is supplied via user input, and wherein the structure characteristic information includes at least one item selected from the group consisting of: a shape and style characteristic, a depth factor, a gemstone species, and a correction factor.

10. A system comprising:
    a control panel having a structure characteristic information input interface, wherein the structure characteristic information input interface receives structure characteristic information;
    an imaging assembly comprising a coaxial light assembly and a diffuse dome light assembly, wherein the imaging assembly generates an image of a surface of a gemstone;
    a weight estimation controller, wherein the weight estimation controller generates a weight estimation of the gemstone based on the image of the surface of the gemstone and on the structure characteristic information; and
    a foot pedal, wherein the weight estimation is generated in response to user input supplied via the foot pedal, and wherein no other user input is involved in generating the weight estimation of the gemstone other than the structure characteristic information and user input supplied onto the foot pedal.

11. The system of claim 10, further comprising:
    a display panel that displays output from the imaging assembly, the generated image, and the weight estimation.

12. The system of claim 11, wherein the weight estimation controller generates feedback overlaid on the image on the display panel, and wherein the feedback indicates features detected in the image.

13. The system of claim 10, wherein the imaging assembly further comprises:
    a camera; and
    a lens.

14. The system of claim 10, wherein the weight estimation controller uses the image of the surface of the gemstone to determine at least one dimension of the gemstone.

15. The system of claim 10, wherein the gemstone has at least one of a table length or a diameter, wherein the weight estimation controller determines the table length or the diameter from the image, and wherein the weight estimation controller uses the structure characteristic information and at least one of the table length or the diameter to determine the weight of the gemstone.

16. The system of claim 10, wherein the structure characteristic information includes at least one item selected from the group consisting of: a shape and style characteristic, a depth factor, a gemstone species, and a correction factor.

17. A system comprising:
a control panel having a structure characteristic information input interface, wherein the structure characteristic information input interface receives structure characteristic information of a gemstone, and wherein the control panel is coupled to a user input interface; and
means for generating an image of a surface of the gemstone, wherein the image is usable to generate a weight estimation of the gemstone based on the image of the surface of the structure and on the structure characteristic information, wherein the means is also for selectively supplying light directly onto a table facet of the gemstone before the image is generated, wherein the means is also for selectively supplying uniform light to the gemstone before the image is generated, wherein generating weight estimation of the gemstone based on the image occurs in response to detecting user input via the user input interface, wherein no other user input is involved in generating the weight estimation of the gemstone other than the structure characteristic information and the user input.

18. The system of claim 17, wherein the means comprises a camera, an achromatic doublet or motorized objective lens, a coaxial light assembly, and a diffuse dome light assembly, wherein the coaxial light assembly supplies the light directly onto the table facet of the gemstone, and wherein the diffuse dome light assembly supplies uniform light to the gemstone.

19. An optical weight estimation system comprising:
a control panel having a structure characteristic information input interface, wherein the structure characteristic information input interface receives structure characteristic information;
an imaging assembly comprising a coaxial light assembly and a diffuse dome light assembly, wherein the imaging assembly generates an image of a surface of a gemstone;
a weight estimation controller, wherein the weight estimation controller generates a weight estimation of the gemstone based on the image of the surface of the gemstone and on the structure characteristic information; and
a user input interface, wherein the weight estimation is generated in response to user input supplied via the user input interface, and wherein no other user input is involved in generating the weight estimation of the structure gemstone other than the structure characteristic information and user input supplied via the user input interface.

* * * * *

UNITED STATES PATENT AND TRADEMARK OFFICE
CERTIFICATE OF CORRECTION

| | | |
|---|---|---|
| PATENT NO. | : 12,456,219 B1 | |
| APPLICATION NO. | : 17/888452 | |
| DATED | : October 28, 2025 | |
| INVENTOR(S) | : Page et al. | |

It is certified that error appears in the above-identified patent and that said Letters Patent is hereby corrected as shown below:

In the Drawings

FIG. 7 is replaced with the attached corrected FIG. because the printed FIG. 7 contained two errors: 1) "FOOD PEDAL" should be "FOOT PEDAL" and 2) "IMAGE ANALYZER" should include an underlined reference number "74" below FIG. 8 is replaced with the attached corrected FIG. because the printed FIG. 8 contained an error: "IMAGE ANALYZER" should include a reference number "74" below In the Specification Column 3, Line 45, currently reads as:
mond 11 is mounted or set in the ring 10 via prongs 13, the And should read as:
mond 11 is mounted or set in the ring 10 via prongs 12, the Column 19, Line 6, currently reads as:
obtained images. Circle is but one type of shape that can be And should read as:
obtained images. A circle is but one type of shape that can be Signed and Sealed this
Twenty-third Day of December, 2025

John A. Squires
*Director of the United States Patent and Trademark Office*

WEIGHT ESTIMATION CONTROLLER

IMAGE ANALYZER